United States Patent
Garcia Morchon et al.

(10) Patent No.: US 11,909,877 B2
(45) Date of Patent: Feb. 20, 2024

(54) PUBLIC/PRIVATE KEY SYSTEM WITH DECREASED PUBLIC KEY SIZE

(71) Applicant: KONINKLIJKE PHILIPS N.V., Eindhoven (NL)

(72) Inventors: Oscar Garcia Morchon, Eindhoven (NL); Sauvik Bhattacharya, Eindhoven (NL); Ludovicus Marinus Gerardus Maria Tolhuizen, Waale (NL)

(73) Assignee: Koninklijke Philips N.V., Eindhoven (NL)

(*) Notice: Subject to any disclaimer, the term of this patent is extended or adjusted under 35 U.S.C. 154(b) by 325 days.

(21) Appl. No.: 17/275,251

(22) PCT Filed: Sep. 2, 2019

(86) PCT No.: PCT/EP2019/073327
§ 371 (c)(1),
(2) Date: Mar. 11, 2021

(87) PCT Pub. No.: WO2020/053013
PCT Pub. Date: Mar. 19, 2020

(65) Prior Publication Data
US 2022/0078011 A1  Mar. 10, 2022

(30) Foreign Application Priority Data
Sep. 12, 2018 (EP) .................... 18194118

(51) Int. Cl.
*H04L 9/30* (2006.01)
*H04L 9/08* (2006.01)

(52) U.S. Cl.
CPC .............. *H04L 9/30* (2013.01); *H04L 9/0861* (2013.01); *H04L 2209/04* (2013.01)

(58) Field of Classification Search
CPC ...... H04L 9/30; H04L 9/0861; H04L 2209/04
See application file for complete search history.

(56) References Cited

U.S. PATENT DOCUMENTS

| 10,097,351 | B1* | 10/2018 | Kelly | .................... H04L 9/3093 |
| 2018/0337899 | A1* | 11/2018 | Becker | ................. H04L 9/0825 |
| 2019/0116035 | A1* | 4/2019 | Mustafa | .................... H04L 9/14 |
| 2019/0132117 | A1* | 5/2019 | Kuang | ...................... H04L 9/30 |

(Continued)

FOREIGN PATENT DOCUMENTS

| CN | 102664732 A | * | 9/2012 | |
| EP | 3364596 A1 | | 8/2018 | |
| WO | WO-2013152725 A1 | * | 10/2013 | ........... H04L 9/0819 |

OTHER PUBLICATIONS

"Suvik Bhattacharya et al.", "Round5: Compact and Fast Post-Quantum Public-Key Encryption", "2018" (Year: 2018).*

(Continued)

*Primary Examiner* — Darshan I Dhruv

(57) ABSTRACT

Some embodiments are directed to a public-key encryption device (20) and a private-key decryption device (10). The public-key encryption device is configured to compute a second public-key matrix (u), the second public-key matrix (u) having fewer matrix elements than the first public-key matrix (b) of the private-key decryption device. This reduces computation and bandwidth requirements at the side of the public-key encryption device.

32 Claims, 9 Drawing Sheets

(56) References Cited

U.S. PATENT DOCUMENTS

2019/0197426 A1* 6/2019 Kawano ............... G06F 17/14
2019/0312728 A1* 10/2019 Poeppelmann ....... H04L 9/3093

OTHER PUBLICATIONS

International Search Report and Written Opinion from PCT/EP2019/073327 dated Oct. 23, 2019.
Baan et al "Round2: KEM and PKE Based nn GLWR" International Assoc. for Cryptologic Research, Dec. 5, 2017.
Bos et al "Frodo: Take Off The Ring! Practical Cquantum-Secure Key Exchange From LWE" International Assoc. for Cryptologic Research vol. 20170227 Feb. 27, 2017 p. 1-26.
Menezes et al "Chapter 12: Key Establishment Protocols Ed" Handbook of Applied Cryptography, CRC Press. p. 489-541, Oct. 1, 1996.
Cramer et al "Design and Analysis of Practical Pubic-Key Encryption Schemes Secure Against Adaptive Chose Ciphertext Attack" IACR, vol. 20011217, Dec. 17, 2001 p. 1-65.
Bhattacharya et al "Round 5: Compact and Fast Post Quantum Public Key Encryption" IACR vol. 20180809 Aug. 6, 2018 p. 1-37.
Vadim Lyubashevsky et a "On Ideal Lattices and Learning with Errors Over Rings", Jun. 25, 2013 Blavatnik School of Comuter Science.
Alkim et al."NewHope Simple without Reconsiliation" Published 2016 Computer Science IACR Cryptol. ePrint Arch.
Lindner et al "Beter Key Sizes (and Attacks) for LWE-Based Encryption" Nov. 30, 2010 Cryptology ePrint Archive: Report 2010/613.
Bhattacharya et al. . "spKEX: An optimized lattice-based key exchange" Cryptology ePrint Archive: Report 2017/709.
Alkim et al. Cryptology ePrint Archive: Report 2016/1157. "NewHope without reconciliation" https://eprint.iacr.org/2016/1157.
Abhishek Banerjee et al "Pseudorandom Functions and Lattices", Sep. 29, 2011 School of Computer Science, Georgia Inst. of Tech.
Oded Regev "On Lattices, Learning with Errors, Random Linear Codes, and Cryptography", Journal of the ACM, Sep. 2009 artilce No. 34.
Saarinen MJ.O. (2018) HILA5: On Reliability, Reconciliation, and Error Correction for Ring-LWE Encryption. In: Adams C., Camenisch J. (eds) Selected Areas in Cryptography—SAC 2017. SAC 2017. Lecture Notes in Computer Science, vol. 10719. Springer, Cham. https://doi.org/10.1007/978-3-319-72565-9_10.
Garcia Morchon Round 2: KEM and PKE based on GLWR Submitted to NIST PQC Nov. 16, 2017.
Baan et al Round 5 KEM and PKE based on (Ring) Learning with Rounding Mar. 28, 2019 Submittsion to NIST PQC.

* cited by examiner

PUBLIC/PRIVATE KEY SYSTEM WITH DECREASED PUBLIC KEY SIZE

CROSS-REFERENCE TO PRIOR APPLICATIONS

This application is the U.S. National Phase application under 35 U.S.C. § 371 of International Application No. PCT/EP2019/073327, filed on Sep. 2, 2019, which claims the benefit of EP Patent Application No. EP 18194118.8, filed on Sep. 12, 2018. These applications are hereby incorporated by reference herein.

FIELD OF THE INVENTION

The invention relates to a public-key encryption device, a private-key decryption device, a public-key encryption method, a private-key decryption method and a computer readable medium.

BACKGROUND OF THE INVENTION

One way to address problems with key distribution is to use so-called asymmetric cryptography. In asymmetric cryptography, a key pair is used which comprises a public-key and a private-key. For this reason, asymmetric cryptography is also called public-key cryptography.

The public keys may be disseminated widely, but private keys are typically known only to few parties, e.g., only to its owner. The public key can be used to encrypt messages which can only be decrypted with the private key. In a public key encryption system, any person can encrypt a message using the receiver's public key. The encrypted message can only be decrypted with the receiver's private key. It is computationally impractical to find the private key from its corresponding public key. The public key and private key are referred to as a key pair.

Known public key encryption systems rely on cryptographic algorithms based on mathematical problems that currently admit no efficient solution. For example, the RSA public-key encryption system relies on the difficulty of integer factorization. Public key encryption based on elliptic curves relies on the difficulty of discrete logarithms.

Quantum computers pose a significant threat to modern cryptography. The two most widely adopted public key cryptosystems, namely, RSA and Elliptic Curve Cryptography (ECC), will be broken by general purpose quantum computers. Lattice based cryptography may be used as a quantum-computer resistant alternative. Unfortunately, lattice computing requires large public-keys for their security.

SUMMARY OF THE INVENTION

These and other problems are addressed by embodiments described herein. A public-key encryption device is provided and a private-key decryption device. Using the public-key encryption device a transmission key can be transferred to the private-key decryption device. The transmission key may be used to encrypt a message. Having access to the public-key thus allows encryption of a message, but access to the private-key is required for decryption said encrypted message.

The public-key encryption device may be configured to obtain a first public-key matrix associated with the private-key decryption device, and to generate a second public-key matrix, the second public-key matrix having fewer matrix elements than the first public-key matrix.

Because the second public-key matrix has fewer matrix elements than the first public-key matrix, the overhead during an encryption phase, e.g., when encrypting a message, e.g., the overhead required to send the transmission key is reduced, in particular with respect to an enrollment phase, e.g., in which the first public-key is obtained by the public-key encryption device. In particular, the first public-key may be obtained in a different way than in which the second public key is transferred; in particular the first public-key may be pre-distributed, e.g., together with software, e.g., together with browser software. This is particularly advantageous since bandwidth may be easier to obtain during pre-distribution, than at the moment a public-key encryption is needed.

Various embodiments can be used for various goals. As a first example, an ephemeral key exchange may be used, e.g., over the internet. Embodiments may be used to minimize the total bandwidth overhead, e.g., (public-key+ciphertext). Note that this equation may be significantly impacted by the fact that the public-key may or may not be already available. As another example, one may minimize the ciphertext, e.g., for use in a messaging application, such as e-mail. Even if minimizing the size of the ciphertext would imply that the public-key is longer, then this is not relevant since this is transmitted once.

Before transferring a transmission key, the two devices may engage in a negotiation on which public-key to use. For example, if a key is pre-distributed, then the public-key encryption device may prefer to use the pre-distributed key. For example, if no public-key is pre-distributed, then the public-key encryption device may prefer to obtain a smaller public-key. If two public-keys are available, then the public-key encryption device may prefer the larger one, since that reduces the bandwidth needed to transfer the encrypted message.

Interestingly, the size of the second public-key may be decided at the time of the encryption, e.g., during the encryption phase, and not, e.g., during the enrollment phase. This has the advantage that the size of the second public-key may be chosen in dependence on the size of the transmission key that is to be transferred with it. For example, for a high security application the transmission key may have more bits than in a lower security application. In the latter situation, overhead to transfer the transmission key may be smaller.

In an embodiment, the second public-key matrix has a first system dimension and a second dimension, the first public-key matrix has the first system dimension and a second dimension, the second dimension of the second public-key matrix being smaller than the second dimension of the first public-key matrix. In particular, the second dimension of the second public-key matrix may be 1; the second dimension of the first public-key may be larger than 1.

In an embodiment, high noise lattice problems are combined with parity bits to obtain second public-keys that are less than 1.5 kB, thus avoiding packet fragmentation when such embodiments are used in computer networks.

The public-key encryption (PKE) may be based on unstructured lattice problems, e.g., as in the Learning with Errors or the Learning with Rounding problems, or combinations thereof. Embodiments may be optimized to ensure minimum bandwidth and computational overhead for the encryptor, at the cost of a larger public-key of the decryptor. Nevertheless, the public-key needs to be communicated only once and stored. Not only may the required bandwidth be reduced for encryption but the encryption may be more efficient since encryption is faster and results in smaller cipher texts. To be specific, the ciphertext for a non-ring configuration may be less than 2000 B.

The public-key encryption device and the private-key decryption device may be electronic devices. For example, they may be a computer or a server, etc. They may be mobile electronic devices, e.g., a mobile phone, a smart card. The public-key encryption device and the private-key decryption device may be consumer electronics, e.g., a set-top box, a television. Public key encryption device may be sensors.

Devices and methods according to an embodiment may be applied in a wide range of practical applications. Such practical applications include a number of cryptographic protocols. Such practical applications include messaging applications, sensor networks, data communication, financial applications, etc.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a private-key decryption device 100, FIG. 1b schematically shows an example of an embodiment of a public-key encryption device 200, FIG. 1c schematically shows an example of an embodiment of a cryptographic system 101, FIG. 2a schematically shows an example of public-key encryption and of private-key decryption, FIG. 2b schematically shows an example of public-key encryption and of private-key decryption, FIG. 2c schematically shows an example of a handshake, FIG. 3 schematically shows an example of public-key encryption and of private-key decryption, FIG. 4 schematically shows an example of public-key encryption and of private-key decryption, FIG. 5 schematically shows an example of a cryptographic system according to an embodiment, FIG. 6a schematically shows an example of a public-key encryption method according to an embodiment, FIG. 6b schematically shows an example of a private-key decryption method according to an embodiment, FIG. 7a schematically shows a computer readable medium having a writable part comprising a computer program according to an embodiment, FIG. 7b schematically shows a representation of a processor system according to an embodiment.

LIST OF REFERENCE NUMERALS 1a-5, 7a-7b 10 a private-key decryption device
20 a public-key encryption device
31 an enrollment phase
32 an encryption phase
33 a decryption phase
11-16 a message
100 a private-key decryption device
130 a communication interface
191 a computer network
192 a storage interface
194 a processor
196 a memory
200 a public-key encryption device
230 a communication interface
292 a storage interface
294 a processor
296 a memory
300 a private-key decryption device
301 a cryptographic system
302 a public key depository
305 a communication interface
315 a public/private key generator
320 an error corrector
325 a Diffie-Hellman unit
335 a reconciliation unit
340 a decapsulation unit
350 a public-key encryption device
355 a communication interface
360 a public key obtainer
365 a public/private key generator
370 a code word generator
375 a Diffie-Hellman unit
380 a reliable bit generator
385 a reconciliation data generator
390 an encapsulation unit
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1A:
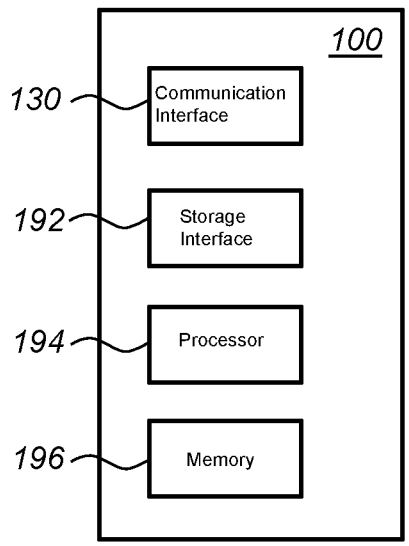

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1B:
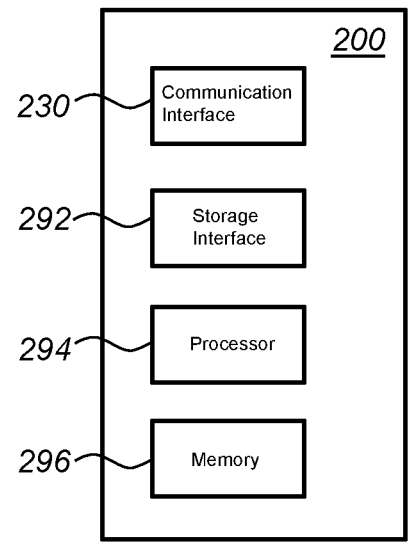
Figure 1C:
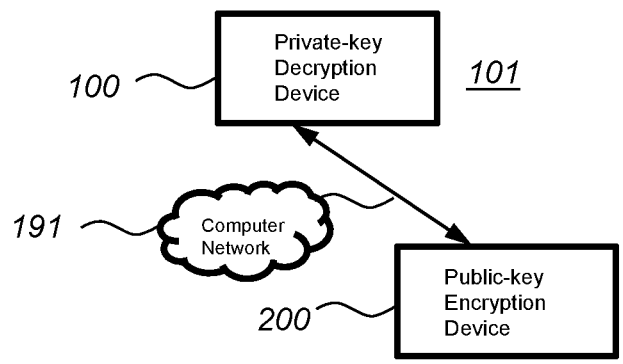

FIG. 1a schematically shows an example of an embodiment of a private-key decryption device 100. FIG. 1b schematically shows an example of an embodiment of a public-key encryption device 200. The private-key decryption device may also be referred to as the first device, or first cryptographic device. The public-key encryption device may also be referred to as the second device, or second cryptographic device. FIG. 1c schematically shows an example of an embodiment of a cryptographic system 101 comprising a private-key decryption device 100 and a public-key encryption device 200. Private-key decryption device 100, and public-key encryption device 200 may comprise one or more of a storage interface 192, 292, a processor 194, 294, and a memory 196, 296, respectively. Private-key decryption device 100 is configured to generate a public/private key pair. The public key and private key comprise a public-key matrix and a private-key matrix respectively. The public-key encryption device 200 is configured to use a public-key matrix and use it to enable a transmission key to be transferred to the private-key decryption device. For example, the transmission key may be used as a key, typically as a symmetric key, to encrypt and later decrypt a message which is to be transferred from the public-key encryption device to the private-key decryption device. The private-key decryption device is configured to use the private-key matrix to obtain the same transmission key. Alternatively, the transmission key could be used as an input to a further key negotiation, e.g., the transmission key may be combined with one or more further key inputs, e.g., to derive a final key, e.g., using a key derivation function taking the transmission key and the further key inputs. The further key inputs may comprise a further transmission key derived obtained from a protocol in which the public-key encryption device and private-key decryption device change places, taking the opposite roles in the various protocols described herein.

The private-key decryption device 100, and public-key encryption device 200, e.g., the various devices of system 101, may communicate with each other over a computer network 191. The computer network may be an internet, an intranet, a LAN, a WLAN, etc. Computer network 191 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 101 as needed. For example, the connection interface may comprise a connector, e.g., a wired connector, e.g., an Ethernet connector, or a wireless connector, e.g., an antenna, e.g., a Wi-Fi, 4G or 5G antenna. For example, private-key decryption device 100, and public-key encryption device 200 may comprise communication interface 130, 230 respectively. Computer network 191 may comprise additional elements, e.g., a router, a hub, etc.

The execution of the private-key decryption device 100, and public-key encryption device 200 may be implemented in a processor, e.g., a processor circuit, examples of which are shown herein. The private-key decryption device 100, in particular the processor of private-key decryption device 100, may implement the functions of the private-key decryption device 10 as shown in FIGS. 2a-2c, 3 and 4. The public-key encryption device 200, in particular the processor of public-key encryption device 200, may implement the functions of the public-key encryption device 20 in these figures. For example, these functions may be wholly or partially implemented in computer instructions that are stored at device 100, or 200, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on device 100, or 200.

Devices 100 and 200 may comprise a storage interface to store and/or retrieve messages, possibly encrypted messages. For example, the storage interface may be implemented locally, e.g., as an interface to a memory comprised in the device, e.g., memory 196, or 296, respectively. The storage interface may also interface with offline, e.g., non-local, storage, e.g., cloud storage, e.g., a storage such as a memory or a drive located in another device. If cloud storage is used the devices may comprise a local storage as well, e.g., a memory. For example, the memory may be used to store computer programming instructions, temporary storage of files and the like.

In the various embodiments of devices 100 and 200, the communication interface may be selected from various alternatives. For example, the interface may be a network interface to a local or wide area network, e.g., the Internet, a storage interface to an internal or external data storage, an application interface (API), etc. In an embodiment, the public-key encryption device and the private-key decryption device are implemented in the same device. This can be helpful to both encrypt and decrypt messages. For example, the communication interface may be a storage interface in which case, the device may be used to store messages in encrypted form, and later retrieve and decrypt them.

The devices 100 and 200 may have a user interface, which may include well-known elements such as one or more buttons, a keyboard, display, touch screen, etc. The user interface may be arranged for accommodating user interaction for initiating a key agreement protocol, responding to a key agreement protocol, sending a message encrypted with a public key, decrypting a message with a public key, etc.

Storage may be implemented as an electronic memory, say a flash memory, or magnetic memory, say hard disk or the like. Storage may comprise multiple discrete memories together making up storage. Storage may also be a temporary memory, say a RAM.

Typically, the devices 100 and 200 each comprise a microprocessor which executes appropriate software stored at the devices 100 and 200; for example, that software may have been downloaded and/or stored in a corresponding memory, e.g., a volatile memory such as RAM or a non-volatile memory such as Flash. Alternatively, the devices 100 and 200 may, in whole or in part, be implemented in programmable logic, e.g., as field-programmable gate array (FPGA). Devices 100 and 200 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, devices 100 and 200 may comprise one or more circuits to implement one or more or all of the functions of the respective device. The circuits may implement the corresponding functions described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 2A:
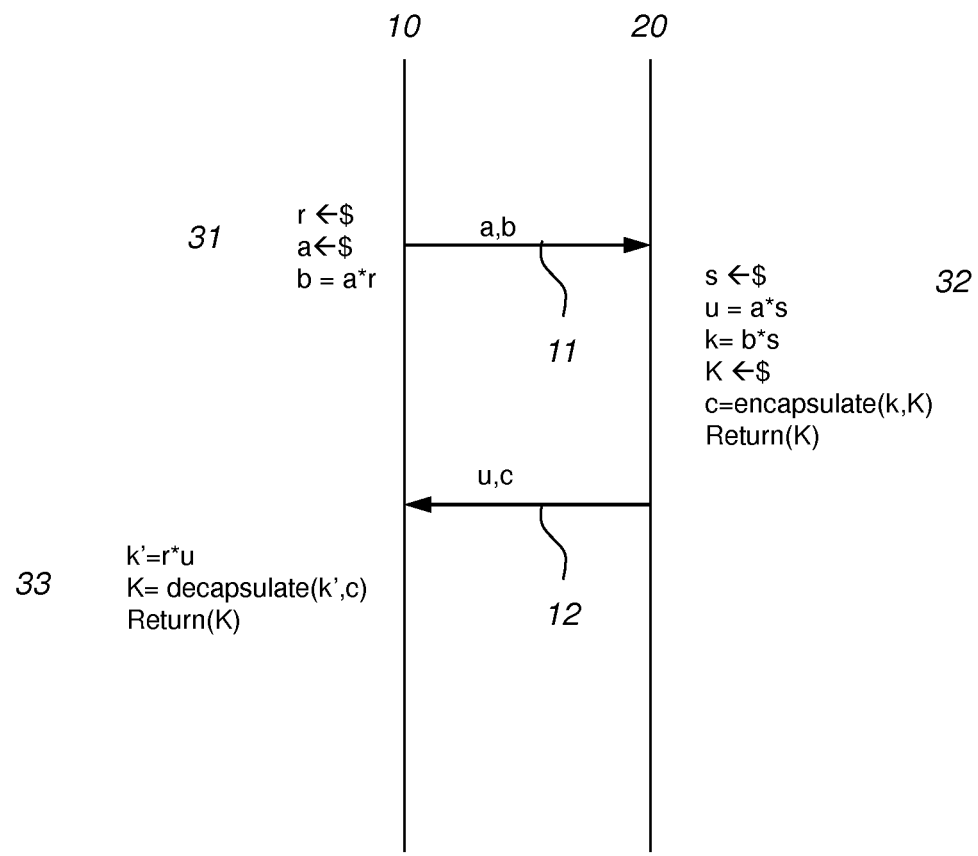

FIG. 2a schematically shows an example of public-key encryption and of private-key decryption. The public-key encryption side is performed by public-key encryption device 20. The private-key decryption side is performed by private-key decryption device 10. The protocols of FIGS. 1a-4 may be executed by a public-key encryption device 200 and of private-key decryption device 100, e.g., as described above.

The notation in FIGS. 2a-4 is as follows:
a represents a public matrix, e.g., a matrix with elements in the integers or a ring, field, etc. The elements may be integers modulo a modulus, e.g., a power of 2. The elements may be polynomials modulo a modulus, e.g., a power of 2, and a polynomial. Matrix a is typically a square d×d matrix. Matrices modulo a modulus are referred to as a non-ring configuration. Matrices with polynomial entries modulo a polynomial and a modulus are referred to as a module configuration.
r and s represent the private key-matrices of the private-key decryption device and the public-key encryption device, respectively.
b and u represent the public key matrices of the private-key decryption device and the public-key encryption device illustrated as the product of a*r or a*s.

The operation * represents the one-way function of the underlying problem. The star (*) operation derives a new mathematical object, e.g., a new matrix, from two underlying matrices, while introducing some noise. For example, noise may be introduced explicitly by adding noise elements, or implicitly, e.g., by rounding. Examples of star operations can be found in (R)LWE or (R)LWR or a module version of them. For instance, a*r may mean Round((A*r (mod q)), p, q), e.g., as in LWR. This means the product of r times the square matrix A modulo q. Then the result is rounded with integers p and q where p<q by performing p/q (A*r (mod q).
c represents the encapsulated transmission key K
encapsulate(k, K) means that the transmission key K is encapsulated with k. For example, if k lives in Z_q, then K may be represented in Z_q too. If k lives in Z_2, then this may be an XOR. Encapsulation may be done element-wise, e.g., interpreting the k and K as a matrix as:

$c = k + K*(q/2) \pmod{q}$.

For example, an encapsulation function may mask a transmission key K using a key k such that an error in k has a limited effect on m, e.g., a linear effect. For example, the bits in a transmission key K may be mapped to Z_q, e.g., by multiplying the elements in K by an element in Z_q; if q is even than q/2 is good choice. Next the elements of key k, which may also be elements of Z_q, are added the mapped elements of K.

decapsulate(k, c) means that the ciphertext c is decapsulated using key k returning a bit string.

Reference is made to:
RLWE: "On Ideal Lattices and Learning with Errors Over Rings", by Vadim Lyubashevsky, Chris Peikert, and Oded Regev,
RLWR: "Pseudorandom Functions and Lattices", by Abhishek Banerjee, Chris Peikert, and Alon Rosen,
LWE: "On Lattices, Learning with Errors, Random Linear Codes, and Cryptography", by Oded Regev.
LWR: "Pseudorandom Functions and Lattices", by Abhishek Banerjee, Chris Peikert, and Alon Rosen,
Hila5: "HILA5: On Reliability, Reconciliation, and Error Correction for Ring-LWE Encryption", by Markku-Juhani O. Saarinen The star operation may be a noisy matrix multiplication, e.g., a regular matrix multiplication followed by adding noise. Adding noise may also be integrated with the matrix multiplication. Adding noise in the star operation may be done in multiple ways. One example of adding noise, is by adding explicit noise, e.g., by generating and adding a noise matrix. An advantage of adding explicit noise is that the noise is under complete control of the cryptographer, and can be fine-tuned, e.g., to obtain precise control over the failure rate of the system versus its security. Furthermore, adding explicit noise has the advantage that all matrices are over the same ring, or field, etc., thus simplifying analysis. Another example of adding noise is scaling down. For example, the matrices a, r, and s may have elements modulo a modulus q, e.g., integers or polynomials modulo q; the star operation may round the result of a matrix operation down from modulo q to modulo p, e.g., by multiplying with p/q and rounding, e.g., rounding up, or rounding down, or rounding to the nearest integer, etc.

In this application small letters will be used for matrices, with the understanding that matrices may need to be transposed whenever needed, e.g., as required by the dimensions of the matrices, and by the requirement that the raw key at both sides should be approximately equal. Typically, there is more than one way to do this; For example, by transposing all matrices in an embodiment, an alternative working embodiment may be obtained.

Below one example is given in which the matrix objects are given in capital letters, and wherein transposing is included. The secret-keys are defined as matrices $S \in \mathbb{Z}^{d \times \bar{n}}$ and $R \in \mathbb{Z}^{d \times \bar{m}}$; note that such secret-key matrices actually contain respectively $\bar{n}$ and $\bar{m}$ independent secret-key vectors. The raw key matrix equals $S^T A^T R$ and $\mathbb{Z}^{\bar{n} \times \bar{m}}$. From each of the entries of the raw key, the B most significant bits are extracted so that a total raw key of length $\bar{n}*\bar{m}*B$ can be generated. The raw key is referred to as such, since there is a probability that the raw keys derived at the public-key encryption device and at the private-key decryption device are not exactly equal.

In an enrollment phase 31:
Private-key decryption device selects a public matrix A and a first private-key matrix R
Private-key decryption device computes first public-key matrix B=AR+E, for some error matrix E.
Private-key decryption device sends: A, B
In an encryption phase 32:
Public-key encryption device selects second private-key matrix: S
Public-key encryption device computes second public-key matrix: $U = A^T S + E'$; for some error matrix E'
Public-key encryption device computes second raw key $B^T S$, note that $B^T S = S^T A^T R + E^T R$;

Public-key encryption device generates a transmission key K and computes the encapsulated transmission key together with reconciliation data as $$C = \left(\frac{p}{2^B}\right)K + B^T R.$$

Public-key encryption device sends: U, C

In a decryption phase 33:

Private-key decryption device computes first raw key $S^T U$, note that $S^T U = S^T A^T R + S^T E'$.

Private-key decryption device decapsulates by computing $C - S^T U$, and rounding the result to multiples of $$\left(\frac{p}{2^B}\right).$$

Next the transmission key K may be obtained from the rounding, e.g., by dividing by $$\left(\frac{p}{2^B}\right).$$

In the above example, the matrices: A, B, S, U, and R, are over Z_p. The value B in the exponent $2^B$ indicates the number of most significant bits taken from the raw keys to encapsulate K. In this example, the remaining lesser significant bits are used as reconciliation data. For example, B=4 bits may be taken for encapsulation. For example, the modulus may be chosen as $p=2^{12}$. The transmission key may be encoded as a matrix, with entries in Z_2^B, e.g., with entries chosen from {0, 1, ..., 2^B−1}. Matrices E and E' may be matrices for which the entries are small modulo p. For example, they may be chosen from the set {0,1, ..., w−1}∪{p−(w−1),p−(w−1)+1, ..., p−1} with small w. The size of w is chosen to balance the security with the failure rate of the system. Low values of w decrease the failure rate of the system.

Matrix C may be computed modulo p. For bandwidth efficiency reasons, the public-key encryption device may compute and send $$C = \left(\frac{t}{2^B}\right)M + B^T R \mod t \text{ where } t \text{ divides } p.$$

In recovering M, the private key decryption device computes $$\left(\frac{p}{t}\right)C - S^T U \mod p.$$

In this case, fewer bits of the raw key are utilized as reconciliation data than are available. Generally, the lesser significant bits have less impact on the failure probability.

Instead of using error matrices, the example may be modified to scale down in the star operations to add noise instead of adding explicit noise. Scaling down has the advantage that bandwidth is reduced.

Returning to FIG. 2a. Shown are an enrollment phase 31 in which the private-key decryption device 10 generates its private and public key matrices, and makes the public key available to the public key encryption device 20. For example, the public key may be sent to device 20. For example, the public key may be deposited in a public-key database, from which device 20 may retrieve it. For example, devices 10 and 20 may be different devices, or may be the same device.

During enrollment phase 31, device 10 generates a first private-key matrix (r) and computes a first public-key matrix (b) from the first private-key matrix (r). For example, device 10 may generate a public matrix (a), and compute the first public-key matrix (b) as a noisy matrix multiplication between the first private-key matrix (r) and the public matrix (a). Transfer of the first public-key matrix (b) from the private-key decryption device to the public-key encryption device 20 is arranged. For example, the first public-key matrix (b) may be sent from the private-key decryption device to device 20 in a message 11.

The public matrix (a) is shared between the public-key encryption device and the private-key decryption device, the first public-key matrix (b) being associated with the public matrix (a). For example, the public matrix is transferred to device 20 in the same way as the public key matrix (b). Typically, matrix a will be generated pseudo randomly from a seed. The matrix can be shared by sending the seed.

The encryption phase 32 may be later, even much later, than the enrollment phase 31. In the encryption phase 32, device 20 generates a transmission key (K), generates a second private-key matrix (s), and compute a second public-key matrix (u) from the second private-key matrix (s). For example, device 20 may obtain the public matrix (a) associated with the first public-key matrix (b), and compute the second public-key matrix (u) as a noisy matrix multiplication between the second private-key matrix and the public matrix (a). The public matrix may be obtained in the form of a seed from which the public matrix generated. In an embodiment, the public matrix is obtained from a different source. For example, both device 10 and device 20 may obtain the public matrix from a third party.

Generating the transmission key may be done randomly.

Device 20 is configured to compute a second raw shared key (k*) from the second private-key matrix (s) and the first public-key matrix (b), computing the second raw shared key comprising a matrix multiplication between the second private-key matrix (s) and the first public-key matrix (b), encapsulate the transmission key (K) with at least part of the second raw shared key by applying an encapsulation function, obtaining encapsulated data (c), and transfer the second public-key matrix (u), and the encapsulated data (c) to the private-key decryption device. For example, the second public-key matrix (u), and the encapsulated data (c) to the private-key decryption device may be sent in a message 12.

Note that this allows the transmission key to be independent from the raw key. This increases resilience against active attacks.

After the private-key decryption device receives from the public-key encryption device the second public-key matrix (u) and the encapsulated data (c), the private-key decryption device can proceed in a decryption phase 33 to compute a first raw shared key (k') from the second public-key matrix (u) and the first private-key matrix (r), compute the first raw shared key comprising a matrix multiplication between the second public-key matrix (u) and the first private-key matrix (r), and decapsulate the encapsulated data (c) using at least part of the first raw shared key (k') to obtain a transmission key.

Interestingly, in an embodiment, the second public-key matrix (u) has fewer matrix elements than the first public-key matrix (b). If all the matrices were square and of the same dimension, then the second public-key matrix (u) and the first public-key matrix (b) would have the same number of elements. It was an insight of the inventors that this not needed. This in turn would mean that the contribution of the public keys to the messages 11 and 12 would be equal. However, the circumstances in which these messages are sent and the devices by which they are sent may be quite different. By selecting the size of the second public-key matrix (u) to be smaller than the first public-key matrix (b) the bandwidth requirement for message 12 is reduced while the bandwidth requirement for message 11 is increased.

One way in which the size of the second public-key matrix (u) may be made smaller than the number of matrix elements of the first public-key matrix (b), is to select an appropriately smaller second private-key matrix. In particular, the second private-key matrix (s) may be chosen to have fewer matrix elements than the first public-key matrix (b). This may imply that the second public-key matrix (u) has fewer matrix elements than the first private-key matrix (r) as well.

For example, in an embodiment a system dimension (d) is chosen. The system dimension determines in part the security of the system. Higher values of n corresponding to higher security. Each of the matrices a, r, b, s, u have one of their dimensions equal to the system dimension d. If error matrices are used, then error matrices e, e' may also have one dimension equal to the system dimension. If the raw keys k, k', and/or transmission key K, are expressed as matrices then these too may have one dimension equal to the system dimension. The other dimensions of these matrices may be chosen so that additions and multiplications (possibly including a transposition) are compatible.

In an embodiment, the public matrix a is a square matrix of dimensions d×d. The first private-key matrix r and first public-key matrix b have dimensions d×$\bar{n}$. The second private-key matrix s and second public-key matrix u have dimensions d×$\bar{m}$. By selecting the second dimension $\bar{m}$ of the second private-key matrix s and second public-key matrix u to be smaller than the second dimension $\bar{n}$ of the first private-key matrix r and first public-key matrix b, it is ensured that the public key u in message 12 has fewer entries than the public key b in the message 11.

For example, by selecting the second dimension ($\bar{m}$) of the second public-key matrix (u) to be, say, at most half the second dimension ($\bar{n}$) of the first public-key matrix (b), it is ensured that second public-key matrix (u) has at most half the number of entries as the first public-key matrix (b).

A particularly advantageous choice for the second dimension ($\bar{m}$) of the second private-key matrix and second public-key matrix is one. This minimizes the size of the second message 12.

For example, message 11 may be sent during an enrollment phase in which more bandwidth is available. For example, message 12 may be sent during active engagement of the system in which less bandwidth is available. For example, device 12 may be a sensor which is provided with the first public key when there is sufficient bandwidth, e.g., during production or set-up, whereas message 12 may be sent during use of the sensor, during which there may be less bandwidth. Note that instead of sending message 11 over, say, a computer network, the first public key may be obtained at device 20 by, say, installing it on a memory device of device 20.

Interestingly, the security of the system is believed to depend more on the system dimension d and on the product $B\bar{n}\bar{m}$ than on the individual sizes of $\bar{n}$ and $\bar{m}$. The latter indicates the length in bits that can be used to derive the raw key. The former influences the size of the underlying lattice and thus the hardness of the underlying cryptographic problem. The probability of decryption failure of the scheme depends in part on the value of B. Higher values of B worsen the failure rate and adversely affect the security of the PKE scheme against adaptive active attacks. Typically, B is fixed, e.g., in the form of standardized parameter sets.

Thus by increasing the size of the first public key, e.g., the size of $\bar{n}$, while decreasing the size of $\bar{m}$ the same security can be maintained while reducing the bandwidth needed for message 12. In particular, a system in which $\bar{n}$=d and $\bar{m}$=d, has a comparable security as a system in which $\bar{n}$=$d^2$ and $\bar{m}$=1.

Interestingly, the second dimension ($\bar{m}$) of the second public-key matrix (u) need not be pre-determined. It can be chosen independent of the choices made for the first private and public-key. In particular, it may be chosen independent on the dimension ($\bar{n}$). In an embodiment, the second dimension ($\bar{m}$) is configurable at the second device 20.

In an example embodiment, one may use B=4, $\bar{n}$=64, $\bar{m}$=1. B indicates the number of most significant bits that are used of a raw key matrix entry.

| Long term public-key configuration | |
|---|---|
| d, n | 1198, 1 |
| q, p, t | $2^{14}$, $2^{12}$, $2^{10}$ |
| B, $\bar{n}$, $\bar{m}$ | 4, 64, 1 |
| μ | 64 |

In the above table:
n: indicates the degree of polynomials in the private and/or public matrices. A value of n=1 indicates that integers modulo a modulus are used. The value n may be referred to as the "ring dimension", e.g., the degree of the chosen polynomial ring.
d indicates the system dimension, e.g., number of columns and rows the public matrix a,
μ indicates the number of elements of the raw key matrix that are used to encapsulate the transmission key. These elements may be pre-determined, e.g., standardized, or may be randomly selected, or may be purposely, e.g., as reliable elements, etc. The shared-secret key length is thus μB; in the above example this is 64×4=256.

In an embodiment, the first public-key may comprise:
1. Seed for regenerating public matrix a. For example, the bit-length of the seed may be chosen the same as the shared-secret; in this example, 256 bits.
2. The public-key matrix b. This matrix may have dimension of d and $\bar{n}$ and have elements chosen modulo p. For example, the first secret matrix may have elements chosen modulo q. In this case noise may be added by scaling down from q to p. The public-key matrix in this example can be encoded in $\log_2 p\ d\bar{n}$ bits; in this example 12×1198×64=920064 bits.
3. Optionally, additional bookkeeping information. For example, an identifier may be included to indicate the type of key; e.g., 1 byte. For example, the identifier may indicate the regeneration method of public matrix a. For example, the value $\bar{n}$ may be included, e.g., 2 bytes. Two bytes for the value $\bar{n}$ allows larger value of $\bar{n}$ to be chosen, e.g., also a value of 512 for $\bar{n}$ is possible for some use-cases. These values and identifiers may be pre-determined, e.g., by a system designer, in which case they do not need to be included. However, including the value of $\bar{n}$ allows dynamically shifting the bandwidth from the encryption phase to the enrollment phase, e.g., to the degree needed for the application.

Total size of the public-key matrix in this example is 115008 bytes. If the seed and/or identifiers are included, an additional 32, or 35, etc., bytes may be added. Note that generating a secret key may be done in various ways. For example, a private-key matrix may be fully random, but it may be subject to restrictions, e.g., hamming weight restrictions. For example, the vectors of length d in a private key matrix may have a predetermined hamming weight; For example, in this example, one may choose the hamming weight 574.

In an embodiment, the ciphertext may comprise:
1. The second public-key matrix u. The second public-key matrix may have dimensions d and $\bar{m}$, with elements chosen modulo p. The public-key matrix in this example can be encoded in $\log_2$ p $d\bar{m}$ bits; in this example 12×1198×1=14376 bits.
2. The encapsulated data c may be encoded as a vector with μ elements, wherein the elements are chosen modulo t. The size of the encapsulated data in this example is μ $\log_2$ t bits; in this example 64×10=640 bits. One may regard this scheme to use $\log_2$ t–B reconciliation bits; in this case 6.
3. Optionally, an authentication tag in case authenticated encryption is used for the message. For example, the authentication tag may be an AESGCM authentication tag, if Galois/counter mode is used. Including the authentication tag in the public-key of a PKE scheme is not necessary.
4. Optionally, The value of $\bar{m}$. For example, this may be 1 byte.

Accordingly, in this example, the ciphertext size may be 12×1198×1+64×10=15016 bits, that is 1877 bytes. ciphertext sizes exclude the size of the encrypted message. Optionally, some bits, e.g., 8 bits may be used to transmit the value of $\bar{m}$. The PQ security of this example is estimated to be $2^{233}$, and the failure rate to be $2^{-129}$.

In an embodiment, active security may be further enhanced using a more elaborate encapsulate function, e.g., as in algorithm 9, in "Round2: KEM and PKE based on GLWR", by Hayo Baan, et al. If so, the ciphertext may comprise a hash g, which may be computed by the public-key encryption device by hashing the public-key of the private key decryption device. The hash may be used to ensure that the final shared-secret contains contributions from both the private-key decryption device and the public-key encryption device. For example, the Fujisaki-Okamoto transform may be used. The hash may for example be the size of the shared secret, in this example 256 bits.

As pointed out above, the transmission key may be used to encrypt a message m. For example, the public-key encryption device may be configured to encrypt the message (m) with the transmission key, and to transfer said encrypted message to the private-key decryption device. The private-key decryption device may receive the encrypted message from the public-key encryption device, e.g., together with the second public-key matrix and the encapsulated date and decrypt the encrypted message with the transmission key.

In an embodiment, the transmission key is independent from the first public-key matrix (b). For example, transmission key K may be generated without using first public-key matrix (b), for example, the transmission key may be generated randomly, and/or generated before first public-key matrix (b) is received at device 20.

Likewise, the transmission key may be independent from the first private key matrix (r). The transmission key may be computationally independent from the second private-key matrix (s) and second public key matrix (u), encapsulated data (c). Computationally independent means that within the computational bounds of the attacker, knowledge of the second private-key matrix does not provide information on the transmission key.

Transmission key K is typically used temporarily, e.g., it may be ephemeral, e.g., used only to encrypt a single message m, or a single session, protocol, handshake or the like. Transmission key K may be a symmetric key, e.g., used as a key in a block cipher.

For example, device 20 may be configured to delete the transmission key encrypting the message and/or the second private-key matrix after encapsulating the transmission key. For example, the transmission key and/or second private-key matrix may be deleted before sending the encapsulated data to device 10. Likewise, device 10 may delete the transmission key after decrypting the message.

In an embodiment, the second private-key matrix is derived from the transmission key. For example, the transmission key may be generated randomly, either true or pseudo, and then used as an input to a key derivation function, e.g., a hash function to derive a seed; there may be additional inputs, e.g., the message, the first public-key matrix, etc. The seed is then used to generate the second private-key matrix, e.g., as a deterministic pseudo-random function depending on the seed. The key derivation function is preferably chosen such that the transmission key cannot be computed from the second private-key matrix.

This has the effect that after device 10 derived the transmission key, device 10 can reconstruct the second private-key matrix from the transmission key, e.g., by applying the same key derivation function and computing the second private-key matrix from it. Next, device 10 can verify if the second public key and/or the encapsulated data was computed correctly. This has the advantage that active attacks are much harder to accomplish. If device 10 finds an anomaly, e.g., a difference between the received data and the recomputed second public key and/or the recomputed encapsulated data, the device 10 may take appropriate action, e.g., generate a warning signal, abort decrypting the second message, etc.

Deriving the second private-key matrix from the transmission key has the advantage of increasing the security towards that of a CCA-secure system. This is advantageous, especially if a first public-key matrix is generated once and used for many messages.

In an embodiment, the processor of the public-key encryption device is configured to compute helper data to reduce the error rate in obtaining the transmission key at the private-key decryption device. It is the nature of public key encryption based on noisy matrix multiplication that there is a chance that reconstruction of the transmission key at the side of the private-key decryption key may fail. The failure probability can be reduced in various ways, one of which is to compute and send helper data which helps the private key decryption device to reach the correct transmission key.

For example, the private-key decryption device may be configured to receive helper data from the public-key encryption device, and to apply the helper data to reduce the error rate in obtaining the transmission key at the private-key decryption device.

There are several types of helper data that may be used. In the example given above, one approach was used, so called reconciliation data. Part of the second raw key may be used to encapsulate the transmission key, and part of it may be used as reconciliation data.

For example, in an embodiment, the second raw key is a matrix, encapsulating the transmission key (K) comprising adding bits of the transmission key to a most significant part of at least part of the elements of the second raw key matrix, and discarding zero or more least significant bits of the at least part of the elements of the second raw key matrix. In an embodiment, all of the bits which are not added to the transmission key to encapsulate it may be used as reconciliation data. However, to reduce bandwidth one or more of the least significant bits may be discarded. Note that not all matrix elements of a raw key matrix need to be used. Elements which are not used, can be discarded in their entirety. This saves in bandwidth. At device 10, decapsulating the encapsulated data may comprise discarding zero or more least significant bits of at least part of the elements of the first raw key matrix, subtracting the at least part of the elements of the first raw key matrix from the encapsulated data, and rounding the subtracting result. Interestingly, the helper data is easily integrated in the encapsulated transmission key.

In an embodiment, the public-key encryption device is configured to one or more of the following:
   a) apply a reliable bit function to the second raw shared key (k*) selecting the part of the second raw shared key, obtaining reliable indices indicating elements of the second raw shared key, bits for encapsulation being derived from the indicated elements, and transfer the reliable indices to the private-key decryption device, and/or
   b) generate reconciliation data (h) for the at least part of the second raw shared key, the reconciliation data comprising information allowing reducing of differences between the first and second raw key derived at the public-key encryption device and the private-key decryption device, and transferring the reconciliation data (h) to the private-key decryption device, and/or
   c) generating parity bits for the transmission key, the transmission key and the parity bits forming a code word according to an error correction code, encapsulating the transmission key comprising encapsulating the code word.

Likewise, the private-key decryption device may be configured to one or more of the following:
   a) receive reliable indices from the public-key encryption device, selecting the part of the first raw shared key indicated by the reliable indices,
   b) receive reconciliation data (h) for the at least part of the first raw shared key (k'), the reconciliation data comprising information allowing reducing of differences between the first and second raw key derived at the public-key encryption device and the private-key decryption device, apply a reconciliation function to the at least part of the first raw shared key and the reconciliation data, and
   c) decapsulate the encapsulated data (c) to obtain a near-code word, apply an error correcting according to the error correcting code.

Reliable bits are bits that are more likely to be computed equally at both sides. For example, some elements of the raw key matrix may be determined as reliable while others, that are unreliable, may be discarded. For the selected matrix elements, reconciliation data may be obtained. Finally, parity bits may be computed to compute still further errors. These three types of helper data are independent, as each one, or each two, or all three, may be used to reduce the failure rate of the private key decryption.

Figure 3:
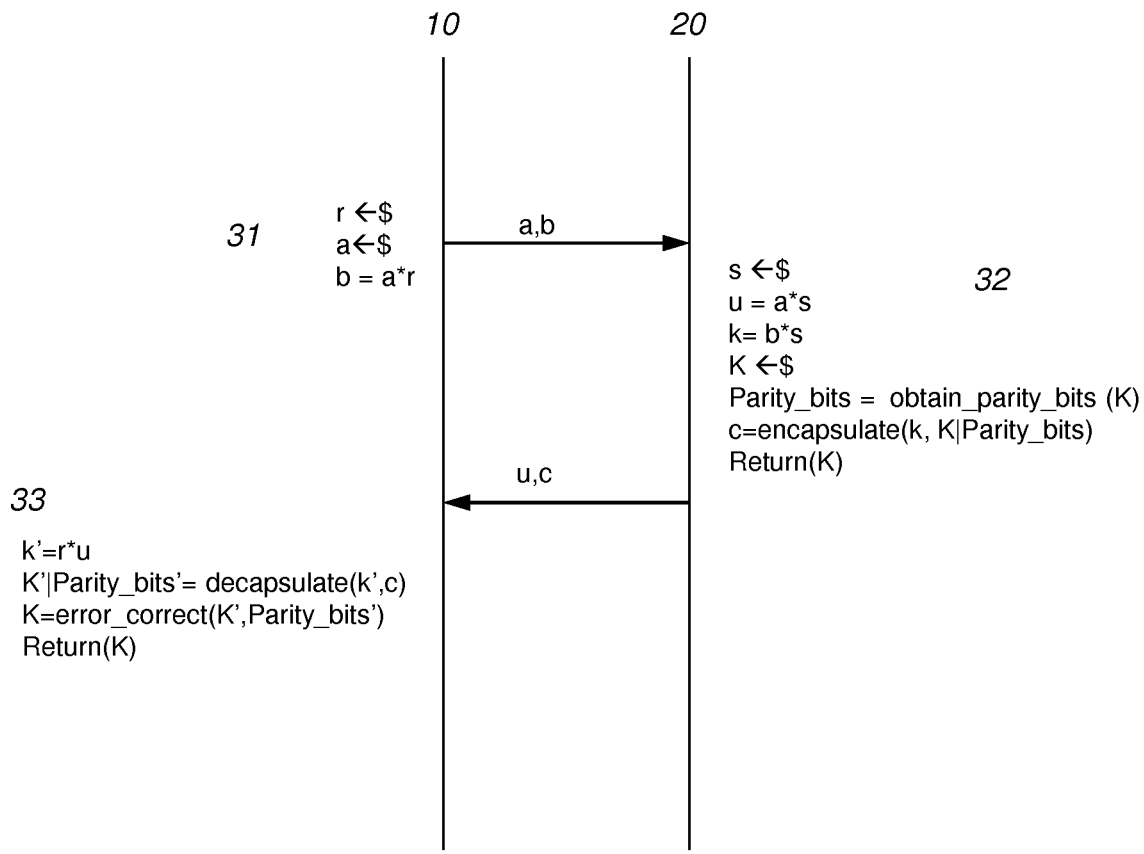

In an embodiment, reconciliation data and parity bits are combined but not reliable bits. An advantage of this approach is that no information regarding the sizes of elements needs to be shared. Helper data may be included in the encapsulated data, but may also be transferred from device 20 to device 10 independently. Reconciliation data may be conveniently integrated with the encapsulated transmission key, e.g., as illustrated herein. An example of an embodiment in which parity bits and reconciliation data are combined but not reliable bits is illustrated in FIG. 3.

In an embodiment of the public-key encryption device or private-key decryption device the reliable bits are one or more most significant bits of the indicated elements, a reconciliation data for an indicated element are one or more bits of the indicated elements following the reliable bits in significance, one or more least significant bits of the indicated elements may be discarded. The indicated elements, that is the reliable elements, may be communicated from the public-key encryption device to the private-key decryption device, e.g., their position in the matrix.

In an embodiment of the private-key decryption device, the elements in the raw key indicated by the reliable indices are selected and replaced with modified elements agreeing with the corresponding reconciliation data. For example, the modified elements may minimize the lee-distance between the selected element and the modified element. The reliable bits may be obtained as one or more most significant bits of the modified elements.

In an embodiment, the modified elements are determined so that they agree with the corresponding reconciliation data that they would not have been discarded by the public-key encryption device. The modified elements minimize the lee-distance between the selected element and the modified element.

Figure 2B:
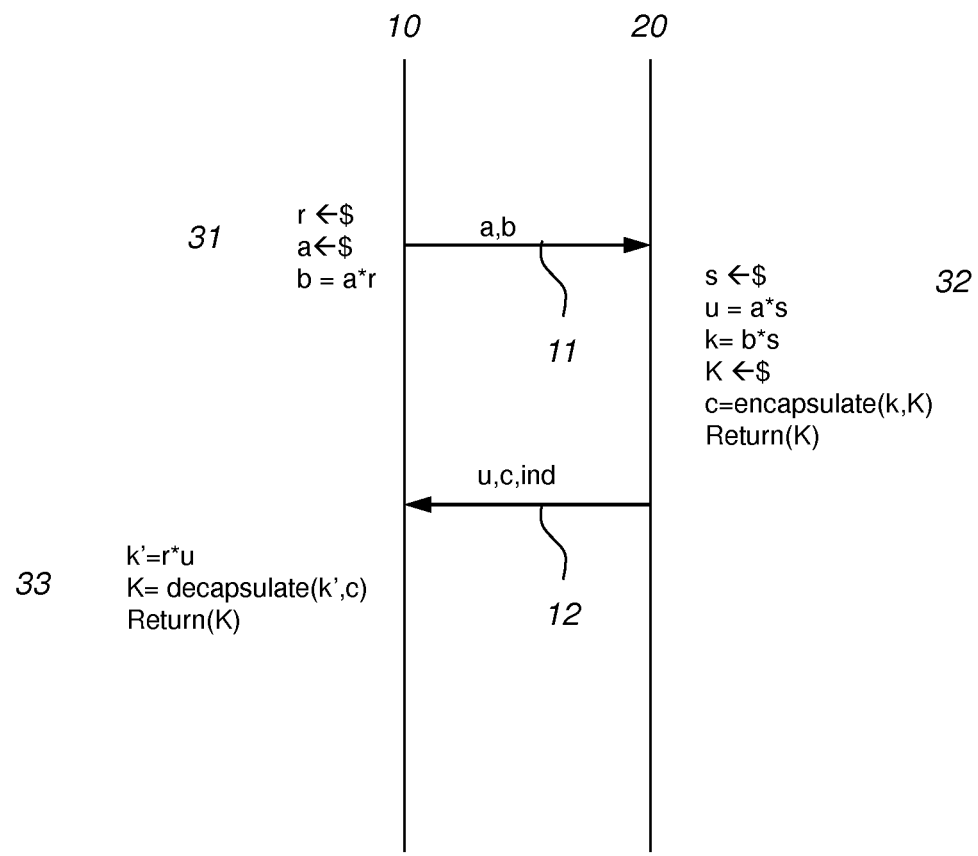

FIG. 2b schematically shows an example of public-key encryption and of private-key decryption. In FIG. 2b, 'ind' represents an indication of the key size or matrix size.

The embodiments illustrated with FIG. 2b built on those of FIG. 2a. A device 10 according to FIG. 2b may be the same as a device 10 for FIG. 2a, during the enrollment phase 31. However, in the encryption phase 32, device 20 is configured to obtain a key size for the transmission key (K) and to generate the transmission key (K) according to said key size. For example, if the information to encrypt is of higher security, then device 20 may select a 256 bit transmission key K, but if the information is of lower security, then device 20 may select a 128 bit transmission key K. Device 20 may determine a matrix size for the second private-key matrix (s) to accommodate encapsulation of the transmission key of said key size. For example, to accommodate a larger transmission key, device 20 may select a larger, e.g., proportionally larger, second dimension $\bar{m}$.

Second dimension $\bar{m}$ may be selected such that $\overline{mnB}$ equals, or is at least as large as the desired bit size of the transmission key. For example, to support 256 bits rather than 128, the second dimension $\bar{m}$ may be selected as twice as large. For example, the $\bar{m}$ may be 2 or 1, so that $\overline{mnB}$ equals 256 or 128.

Depending on the selected dimension $\bar{m}$, device 20 generate the second private-key matrix (s) according to the matrix size, e.g., according to the system dimension d and the second dimension $\bar{m}$. Based on the larger matrix, device 20 then proceeds to compute a raw key and encapsulate the transmission key, e.g., as indicated herein, e.g., as in the context of FIG. 2a. However, device 20 transfers an indication ind of the key size and/or matrix size to the private-key decryption device. For example, indication ind may be the size of the transmission key, e.g., 256, or 128, or 'large' or 'small', or the size of the second public-private key matrix, e.g., the second dimension, e.g., 2 or 1, etc. The indication may be implicit, e.g., by sending larger or smaller second public-key matrix. For example, the second public-key matrix may be sent in a computer network packet or packets, that indicate the size or end etc., of the packet, thus implicitly indicating the size of the second public-key matrix and thus, e.g., of the second dimension.

If the value of $\overline{mn}B$ is larger than needed for encapsulation, one may select a transmission key that is intentionally larger, e.g., with a key size equal to $\overline{mn}B$. The final transmission key can then be computed from the selected transmission key, e.g., by a key derivation function, a hash, etc.

Device 10 may proceed, e.g., as indicated herein, e.g., as in the context of FIG. 2a. For example, device 10 may use the received public-key matrix to compute a first raw key and decapsulate the encapsulated transmission key. The size of the raw key may vary depending on the size of the public-key.

In an embodiment, a first public key is transferred together with a parameter $\overline{n}$ as a parameter of the public-key so that a public key encryption device can determine the required $\overline{m}$ value. For example, $\overline{m}$ may be computed by the public key encryption device such that $B\overline{nm} \geq$ Keylength. For example, in an embodiment, the public-key comprises the public-key matrix b, the public key matrix a, and dimension $\overline{n}$. The latter may be implicit. In other words, device 10 sends to device 20 the parameter set that allows achieving a given security level.

The public-key encryption according to an embodiment may be used in various existing protocols. For example, embodiments may be integrated with protocols such as TLS, IPSec, VPN. For example:

TLS1.3: client sends client_hello. The client_hello, may comprise a public-key matrix. Instead of having the public-key, the client_hello may include a URL indicating where the public-key matrix can be downloaded. If the server does not have the public-key yet, e.g., cached, then the server may proceed to download the public-key matrix and store it locally. With the public-key matrix, the server can encrypt a symmetric-key that sends to the client and it be used as the master key from which the symmetric-keys for the record layer are derived. In this example, the client functions as a private-key decryption device.

TLS1.2: in this example, it is the other way around. The client may send a request, and the server sends a URL where the server public-key matrix can be obtained. The client may download if the public-key is not available yet. And once the client has the public-key matrix, it can proceed to encrypt a transmission key, e.g., to be used in the record layer. In this example, the client acts as a public-key encryption device.

Note that public-keys may be pre-distributed. For example, in a browser, one or more, e.g., a plurality of public-key matrices may be pre-distributed. For example, a public-key may be indicated with a public-key ID, e.g., a hash of the key, so that the software, e.g., the browser can verify if the public-key is obtained through pre-distribution. In the pre-distribution scenario, the asymmetry in bandwidth is an advantage. For example, during pre-distribution it is not a problem if the public key matrices are larger, but during use, the size of the messages is reduced. Also in, say, a VPN, e.g., TLS based, the public-keys may be pre-configured in one or both of the communicating parties.

In an embodiment, device 10 may be configured to send a first hello message that lists cryptographic information, e.g., such as the SSL or TLS version, or, in the client's order of preference, the CipherSuites supported, etc. In response to the first hello message, device 20 may send a second hello message. The second hello message may contain similar details. Device 20 may also send its digital certificate in the second hello message. Device 10 may verify the certificate. The first and/or second hello message may comprise a public-key or an indication of a public-key. In the second hello message and/or a subsequent message one or more transmission keys are agreed on. A transmission key may be used to encrypt or authenticate subsequent communication between device 10 and 20. If multiple transmission keys are agreed, they may be combined into a single key, e.g., they may be hashed together, or XOR-ed, etc.

Figure 2C:
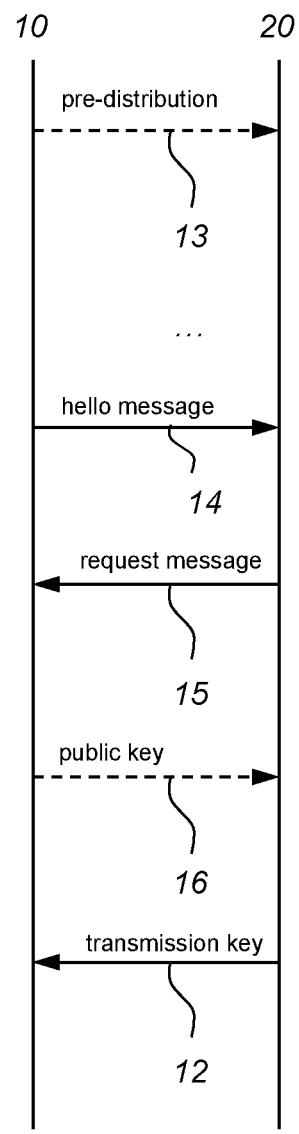

FIG. 2c schematically shows an example of a handshake. The handshake may be used in combination with existing protocols or outside of it. FIG. 2c show messages 12-16, some of which may be combined into a handshake. In particular, one or both of messages 13 and 16 may be omitted. For example, message 15 may be omitted. Time proceeds towards the bottom of the figure.

Message 13 is a pre-distribution, during which, device 20 obtains at least one first public-key matrix (b) associated with the private-key decryption device 10. Later, when device 20 and/or device 10 wants to engage in a handshake protocol, then device 20 receives from device 10 at least two identifiers that indicate at least two first public-key matrices of the private-key decryption device, the two first public-key matrices having different sizes. For example, message 14 may be a hello message. The ellipsis between message 13 and 14 indicates that message 13 is sent before the start of the handshake. For example, public-key matrices may be obtained by device 20 as part of a browser, from a public-key database, etc.

Device 20 selects one of the at least two first public-key matrices by determining if a key-cache of the public-key encryption device comprises the larger of the two first public-key matrices, and if so selecting the larger first public-key matrix. For example, device 20 may comprise a key-cache in which previously obtained public-key matrices are stored. The key-cache may be part of a browser.

There may be various policies for device 20 to select a public-key. A first consideration may be the size of the system dimension. The system dimension may be selected on the basis of the security considerations. A next consideration may be the size of the desired transmission key. Yet another consideration may the size of the resulting message 12 that is to be sent from device 20 to device 10. For example, in an embodiment, device 20 may be configured to select the largest key that is available in the key-cache.

If the desired key is not available in the key cache, and in particular if none of device 10's public-keys are available in the key-cache, then device 20 may send a request message 15; request message 15 requesting the selected first public-key matrix.

In response, the requested public-key may be sent to device 20 in a message 16. Note, that messages 103 and 16 do not necessarily need to come from device 10, but instead may be obtained from say a public-key database, or a software database, etc.

Once, the selected public-key is available, device 20 can proceed with a message 12 as described herein, e.g., by encapsulating a transmission key, etc. Device 20 sends to the private-key decryption device an indication of the selected first public-key matrix. The transmission key (K) is encapsulated with the selected first-public key. Device 20 may use an embodiment as in described with respect to FIG. 2b and use a larger public-key to selectively encapsulate a larger or smaller transmission key.

Device 10 may be correspondingly configured to send a message 14 comprising at least two indications of at least two first public-key matrices of the private-key decryption device, the two first public-key matrices having different sizes, and to receive a message 12 comprising an indication of a selected first public-key matrix from the public-key encryption device.

An embodiment according to FIG. 2c has the advantage that a larger key may be used if it does not incur additional bandwidth, e.g., if it is pre-distributed. The larger key may be used, e.g., to encrypt both larger and smaller transmission keys. If the key is not pre-distributed, the system may opt for a smaller public-key to reduce bandwidth consumption.

For example, in an embodiment, the large public key is selected such that $B*\bar{n}*1 \geq$ Keylength, wherein B is the number of bits taken from the elements of the raw key matrix, e.g., B=1, 2, 4, etc. Keylength is the size of the transmission key, e.g., its value may be 256. For example, with the example values of B=4 and a key length of 256 one may select $\bar{n}$=64. The small public key may be selected such that $B\bar{n}\bar{n} \geq$ Keylength. With the same example values, one may use $\bar{m}=\bar{n}=8$. This choice balances the bandwidth that is needed between both public keys. If a public-key encryption device already has access to the large key, it may use the large key so as to minimize bandwidth. If it does not have access to either key, it may request the smaller key to balance bandwidth. In an embodiment, the large first public key is at least 2 times larger, at least 4 times larger, or at least 8 times larger than the small first public key, etc.

For example, a public-key encryption device may receive from the private-key decryption device a hello message comprising, e.g., {(keyid101, 8), (keyid102, 64)} which indicates a first key with key identifier keyid101 and $\bar{n}$=8, and a second key with key identifier keyid102 and $\bar{n}$=64. If both of the keys or only the key with ID keyid102 is available in a key cache of the public-key encryption device, then it may choose to use this larger key, e.g., using a dimension $\bar{m}$=1. If none of the keys are available, then the public-key encryption device may request keyid101, e.g., from the private-key decryption device or elsewhere. Encryption may then use $\bar{m}$=8. In both cases, the transmission key may be of the same length.

FIG. 3 schematically shows an example of public-key encryption and of private-key decryption. In FIG. 3, the following notation is used.

parity_bits refers to the information used for error correction obtain_parity_bits(k) means that some parity bits of k are obtained. For example, parity bits may be generated according to an error correcting code.

error_correct(k, parity_bits) means that the parity_bits are used to correct potential errors in either k or parity_bits obtaining a version of k that is more likely to be error free The embodiment according to FIG. 3 uses a different type of helper data. For example, according to an embodiment, device 20 computes parity bits for the transmission key. For example, the parity bits together with the transmission key may be a codeword according to an error correcting code, e.g., a BCH code. The code word is encapsulated with the raw key, e.g., as described herein. The encapsulation may include reconciliation data if needed. To decapsulate, device 10 first applies reconciliation data, obtaining a near-code word, e.g., a code word with possible bit-errors therein. The near-code word may be corrected using an error correction algorithm associated with the error correcting code. The use of error correction and reconciliation data improves the decryption failure probability, thus allowing smaller parameters, and improving performance through smaller key-sizes. The combination of parity bits and reconciliation data is a preferred combination, allowing a small size of the public-key matrix.

In an embodiment of the protocol, the first public-key contains $\bar{n}$ vectors. The ciphertext comprises the second public-key u and the encapsulated data c. The second public-key matrix u may be a vector of dimension d with elements in Z_p. To minimize the size of the ciphertext, we may use $\bar{m}$=1. This means that the raw key will have at most $B\bar{n}$ elements. To optimize the size of the raw shared secret, we will take B bits from as many elements as possible, thus using $\mu=\bar{n}$. The encapsulated data c encrypts the transmission key and may have $\mu=\bar{n}$ elements so that a transmission key of length $\kappa=\mu B$ can be encapsulated. B is the number of bits extracted from each vector entry.

In an embodiment, we want to minimize the ciphertext. A new insight to further minimize the ciphertext size may be obtained, even if this comes at the price of a longer public-key is as follows:

The first public-key matrix comprises $\bar{n}$ vectors of length d. With this, one can encapsulate $\bar{n}B=\kappa+$parity_bits_length, wherein $\kappa$ is the transmission key length and there are parity_bits_length bits that serve as parity bits.

The vector c will become parity_bits_length$\times\log_2$ t longer since additional parity bits need to be transmitted. However, because of those parity bits, this scheme can deal better with decryption errors so that smaller values of q and p can be chosen. Since p is smaller, also d may decrease since we can keep the same security level. In summary, by adding error correction code in this way, we can further decrease the size of the ciphertext even if it comes at the price of a longer public key. The choice B=1, is efficient, and using it we need then $\bar{n}=\kappa+$parity_bits_length, In an embodiment, the following parameters are taken:

| Long term public-key configuration | |
|---|---|
| d, n | 786, 1 |
| q, p, t | $2^{16}, 2^8, 2^6$ |
| B, $\bar{n}$, $\bar{m}$ | 1, 192 + 103, 1 |
| $\mu$, $\kappa$, #parity_bits | 192 + 103, 192, 103 |

The 103 parity bits allow for the correction of bit errors. For example, one may use the error correcting code XEf, which allows the correction of 3 bit errors. Xef is described in "Round5: Compact and Fast Post-Quantum Public-Key Encryption", by Sauvik Bhattacharya, et al. An advantage of using XEf is that the decoding can be done efficiently in constant time, thus avoiding timing attacks.

In this embodiment, the ciphertext size would be a bit more than 1 KB. This implies that such a construction can enable non-ring configurations that do not require fragmentation of the ciphertext. It is important to reduce the size of the ciphertext to under, about 1.5 kb, since this avoid fragmentation in packet based communication, in which packets are about 2 kb as used, e.g., on the internet.

Note that the amount of noise introduced by scaling is relatively high. In the above example, 16 bits for the secret matrix elements is reduced to 8 bits for the public matrix elements; that is a reduction of 50%. Compared to the example without parity bits given earlier, 14 bits are reduced to 12 bits, a reduction of about 15%. Likewise, the difference between bit lengths of the secret versus public bits has increased from 2 bits to 8 bits. The higher noise allows for a higher efficiency in the lattice part of the protocol, but at the price of a higher failure rate. The latter is then reduced using the parity bits.

In an embodiment, $\overline{m}=1$ and $\overline{n}=\mu=\kappa+\text{parity\_bit\_length}$. For example, with $\kappa \geq 128$. For example, the number of parity bits may be chosen so that they can correct at least 3 errors. In an embodiment, the $\log_2 p/\log_2 q \leq 0.85$, or $\leq 0.72$, or $\leq 0.7$, or $\leq 0.6$, or even as in the above embodiment 0.5, or even less. Note that no use is made of so-called reliable bits, since all elements in the raw shared key are used, e.g., $\mu = \overline{nm}$. Such high noise may be combined with low $\overline{m}$, in particular with $\overline{m}=1$, or $\overline{m}=2$, etc.

Figure 4:
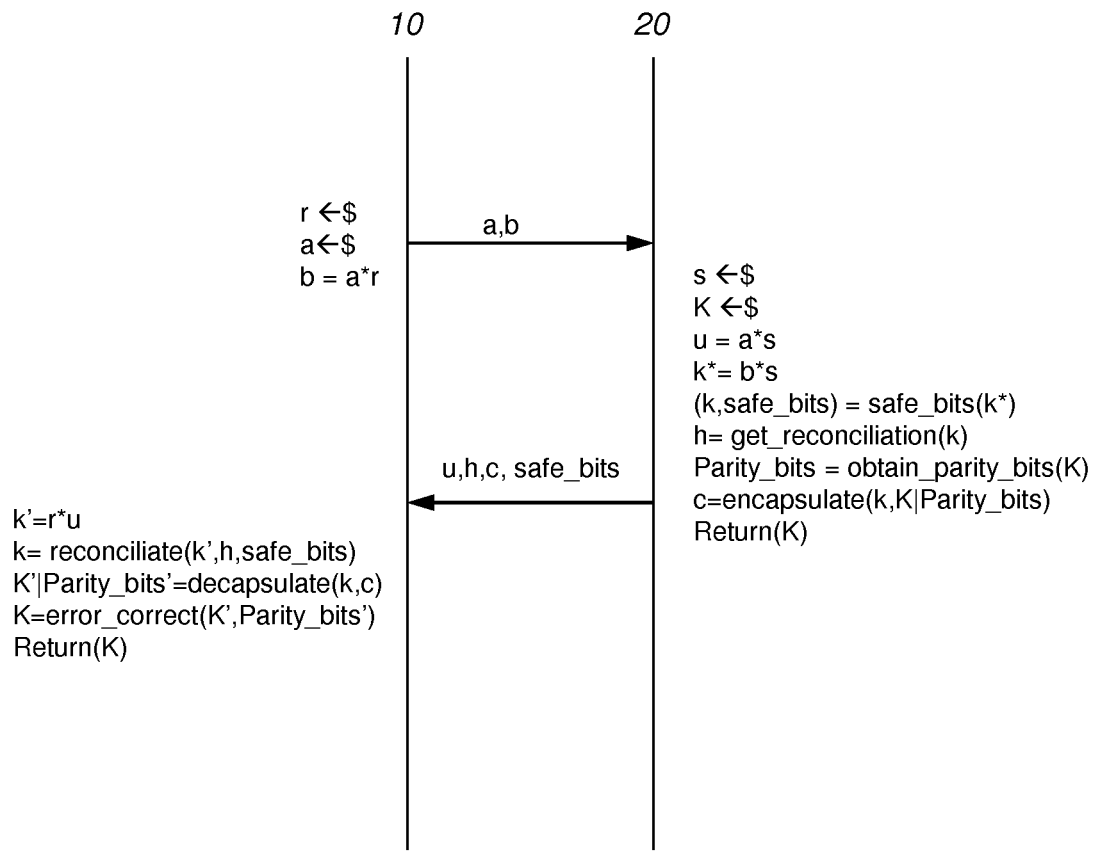

FIG. 4 schematically shows an example of public-key encryption and of private-key decryption. The embodiment of FIG. 4 includes three different sources of error correction: safe bits, reconciliation data and parity bits.

In FIG. 4:
h represents the helper data including reconciliation bits
get_reconciliation(k) is a function that returns reconciliation bits out of raw_key k.
reconciliate(k,h) is a function that reconciliates raw_key k given reconciliation bits h.
safe_bits( ) returns two values: (i) the actual reliable values and (ii) the positions of the key bits that can lead to lower failure probability since the obtained values are further away of the quantification boundaries. The actual values returned by Safe_bits( ) are later used, e.g., for encapsulation. The positions are exchanged to the other party so that it knows which positions are needed.

Interestingly, the three sources of information may be used to reduce failure probability when exchanging the code word, and a randomly generated key from it. Moreover, because a code word can be generated randomly, active security is improved; note that the second private-key matrix may be derived from the code word to further improve active security. The code word may comprise the transmission key and parity bits. These sources include the use of reliable bits, the reconciliation data extracted for coefficients of a raw key, and error correcting redundancy information which is part of the code word, e.g., parity bits.

For example, in an embodiment the device 10 and 20 may agree on a raw key, say a matrix key k* with n coefficients in Z_q. For example, an element in a raw key matrix may be mapped to part of a transmission key, e.g., to one or more bits. For example, half of the values in Z_q may be mapped to 0 and half of them to 1, e.g., B=1. Selecting reliable bits may be done by selecting, e.g., some number, say mu, of coefficients that are furthest away from the decoding boundary so that the likelihood of making an error is lower.

Key reconciliation data may be information which is extracted by the public-key encryption device, e.g., for the chosen, reliable coefficients, say the chosen mu coefficients, of the raw key, say the matrix key. The reconciliation information helps the private-key decryption device to come to the same decision, whether a specific coefficient of the raw key is mapped to what part of the code word. Not that this need only to be done for the selected reliable coefficients, which means that less work is needed.

Error correction information may be parity bits. Parity bits may be extracted from the randomly generated binary key K, message m or pre-key so that the information that the second device encapsulates has some redundancy. In this way, even if errors are made before, device 10 can correct them. So if you want to transmit a key K that is kappa bits long and there are (mu–kappa) parity bits, these parity bits help device 10 to make sure that the kappa bits of the key K are correct.

A problem of many quantum resistant public-key encryption is that they have some failure probability. For example, a private-key decryption device and a public-key encryption device initially agree on a noisy raw key, which is then reconciled, e.g., through reconciliation data. A reliable bit function allows the public-key encryption device, e.g., the party that first derives the raw key, to identify which bits in the raw key are more likely to be derived in the same way by the private-key decryption device, and which bits in the raw key are less likely to be the same.

A straightforward implementation of a reliable bit function defines two or more center points for the coefficients that are sampled to obtain key bits. Coefficients that are too far away from the center points, e.g., according to a threshold, may be discarded whereas the remainder may be sampled to a value associated with the center point. For example, the number of center points may be a power of 2. For example, the matrix elements may be taken from a variety of different rings and the like.

Reliable bit sampling uses the assumption that not all bits given by a ring dimension are needed for the keys. Typically, the dimension of the underlying matrices y is much larger than the required key length. For example, the public-key encryption device may select m indexes in y that are most likely to agree. These safe coefficients may be those that are closest to center points of the coefficients ranges that are mapped to a zero bit or to a one bit; k=0 and k=1. For example, in a ring modulo q a coefficient may be mapped to 0 if it is in the range $$\left[\left\lfloor \frac{q}{4} \right\rfloor - b, \left\lceil \frac{q}{4} \right\rceil + b\right]$$

and to 1 if it is in the range $$\left[\left\lfloor \frac{3q}{4} \right\rfloor - b, \left\lceil \frac{3q}{4} \right\rceil + b\right],$$

or vice versa. If the coefficient is in neither range it is not a reliable bit. The value b determines, in part, the reliability of the bits. For example, in this case it may be chosen as q/8; smaller values for b provide more reliability but less key bits. In this case the center points may be q/4 and 3q/4, or a rounding thereof.

The public-key encryption device who applies the above procedure, obtains indices of reliable bits and key bits that correspond to them. The reliable indices may be communicated to the private-key decryption device, the reliable key bits are not. The private-key decryption device can obtain key bits from the bit at the indices indicated by the public-key encryption device. As these bits are more reliable, the error rate will be lower.

Further implementations of a reliable bit functions can be found in the paper Hila 5, included herein by reference. For example, the algorithms in section 3 may be applied. The inventors found that reliable bit functions may be applied in a range of situations, e.g., with different underlying rings or objects, e.g., in particular on matrices.

In embodiments, the two parties generate two raw keys, e.g., matrices that are approximately, but not exactly equal. To come to exact agreement, some reconciliation data is sent. A scheme for doing so is explained in a patent application of the same applicant, with title "REACHING AGREEMENT ON A SECRET VALUE", filed at the EPO on 4 Nov. 2016, with application Ser. No. 16/197,277.3; for example, the method on pages 7-10 may be used for reconciliation in embodiments. Variants disclosed elsewhere in the cited patent application may also be adopted.

In this application, we will use the following notation for the following three functions:

1. Rounding Function $\lfloor \cdot \rceil_{B,b_h}$: For q, $b_h$, B∈Z, $b_h \geq 1$, B<$\log_2 q - b_h$, let
$\bar{B} = \log_2 q - B$. Then,
$\lfloor \cdot \rceil_{B,b_h}: v \rightarrow \lfloor 2^{-\bar{B}} \cdot v \rceil \pmod{2^B}$ Intuitively, $\lfloor v \rceil_{B,b_h}$ extracts the B most significant bits of $\{v + 2^{\log q - (B+b_h)}\}$, where the second component is a rounding factor to ensure unbiased rounding errors. B indicates the number of bits that are extracted form a symbol v, and $b_h$ indicates the number of helper data bits. In an embodiment, q may be a power of 2.

2. Cross-Rounding Function $\langle \cdot \rangle_{B,b_h}$: For q, $b_h$, B∈Z, $b_h > 1$, B<$\log_2 q - b_h$, let
$\bar{B} = \log_2 q - B$. Then,
$\langle \cdot \rangle_{B,b_h}: v \rightarrow \lfloor 2^{-\bar{B}+b_h} \cdot v \rceil \pmod{2^{b_h}}$ Intuitively, $\langle v \rangle_{B,b_h}$ extracts the $b_h$ least significant bits of the $(B+b_h)$ most significant bits of v.

3. Reconciliation Function rec(w,b):
For q, $b_h$, B∈Z, $b_h \geq 1$, B<$\log_2 q - b_h$, w∈$Z_q$, b∈$[0,2^{b_h})$,
rec(w,b)=$\lfloor V \rceil_{B,b_h}$
where v is the closest element to w such that $\langle v \rangle_{B,b_h}$=b. The closest element w may be taken according to the Lee distance, e.g., min(|v−w|, q−|v−w|).

These three functions can be applied element-wise to matrices. The above cited reconciliation function is used as an example, herein. As noted, the reconciliation methods in the above cited application could also be used. The cross-rounding function can be applied to obtain the reconciliation data and the rounding function to obtain the data which is reconciled, e.g., the reliable bits. When the reconciliation data is later used in the reconciliation function, the reconciled data is recovered. In other words: rec(w,$\langle v \rangle$)=$\lfloor v \rceil$, assuming that v and w are within a threshold distance of each other.

Figure 5:
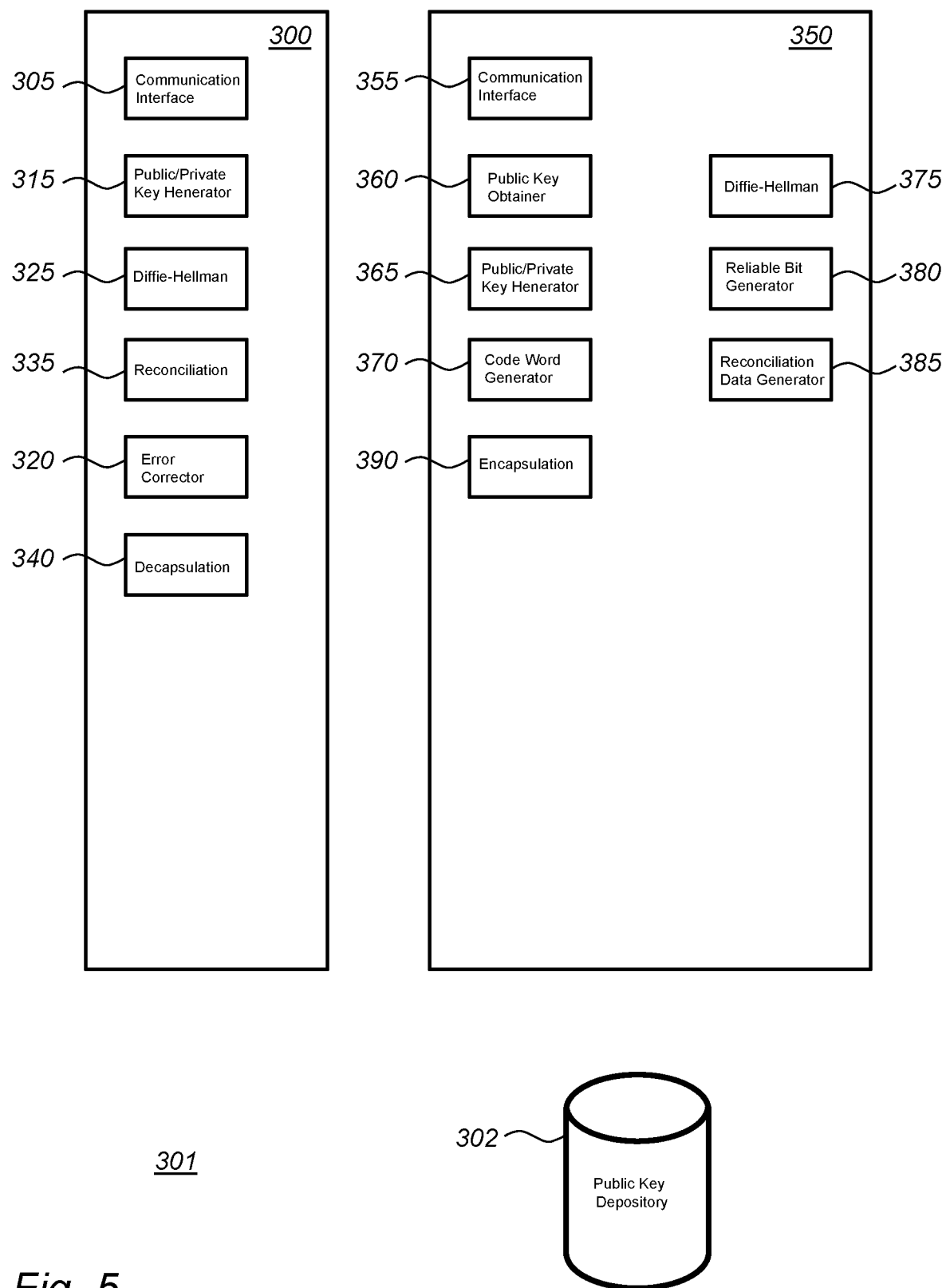

FIG. 5 schematically shows an example of a cryptographic system 301 according to an embodiment. System 301 comprises a private-key decryption device 300, a public-key encryption device 350 and optionally a public key depository 302. For example, the first device 300 and second device 350 may be implemented on a device such as first device 10, 100 and/or second device 20, 200. Cryptographic system 301 may implement a public-key encryption system as illustrated in FIG. 4. Cryptographic system 301 may be adapted to other embodiments as desired, e.g., by omitting elements that are unused in said embodiments.

First and second device 300 and 350 are configured to perform a cryptographic protocol. They have the ability to securely pass data from one device to the other. Various cryptographic protocols may use this same ability. As an example, two protocols are described that use this ability.

For example, the first and second device may be configured public key encryption, e.g., designed to allow other devices, say second device 350, to encrypt a message (m) such that a particular device, say first device 300 can decrypt them. However, the contents of the public-key encrypted message cannot be obtained by other devices than the encrypting and decrypting device, e.g., second device 350 and first device 300. In case of public key encryption, the same public key of the first device, e.g., the same first public key and public object, may be used by multiple second devices to send encrypted messages to the first public device. Even if two second devices use the same public key to encrypt a message, they cannot decrypt the other's communication.

The first device 300 and second device 350 comprise a communication interface 305 and 355 respectively. The communication interfaces are configured to communicate with each other. Examples, of communication interfaces, e.g., over wired or wireless networks, are described herein.

First device 300 comprises a public/private key generator 315 configured to generate a first private key (r) and a first public key (b) derived from the first private key. Deriving the public key from the private key may use a public object (a), e.g., a public matrix. For example, generating the public key may involve multiplication with the public object, and/or introducing some type of noise, e.g., scaling down the multiplication result, adding a noise term, etc. The private key and public object may be a matrix, e.g., over a finite field or ring.

The first private and public key may be generated ephemerally. For example, the latter may be done for a key agreement protocol, especially, if the first and second device use some other authentication mechanism, e.g., an out-of-band mechanism, e.g., certificate based authentication or the like, to authenticate each other. The first private and public key may also be generated for longer term use. For example, the first public key may be stored in an external public key depository 302. Public key depository 302 may also store the public object (a) or seed therefor.

The first public key is transferred from the first device 300 to the second device 350, e.g., through communication interfaces 305 and 355. This may be done by direct communication, or indirect, e.g., through public key depository 302. Together with the first public key, also the public object (a), may also be transferred, if needed. For example, the public object may be transferred by sending a seed from which the public object (a) may be generated.

Second device 350 may comprise a public key obtainer 360, e.g., configured to retrieve the first public key from public key depository 302. For example, this type of obtaining is suitable for public key encryption. However, the public key may also be obtained directly from the first device, possibly out-of-bound, e.g., in an email. The public key may be stored until needed for a public key encryption exchange. However, the first public key may also be received for immediate use, e.g., for a key sharing operation, e.g., in this case the first public key and/or public object, may be ephemerally generated.

Second device 350 may comprise a public/private key generator 365 configured to generate a second private key (s) and to generate a second public key (u) from the second private key (s). The second private key (s) and second public key (u) may be smaller, e.g., have fewer entries, than the first private key (r) and first public key (b).

The second public key uses the same public object as generating the first public key did. The first and second private keys are private to their respective devices. They may be shared with trusted parties if needed, e.g., for back-up, key escrow, etc. The public keys, and the public object are not necessarily secret for security; nevertheless one or more of them may still be private to first and second device if desired. For example, the first public key may only be shared with the second device, and vice versa.

Second device 350 may comprise a code word generator 370. Code word generator 370 is configured to generate a code word according to an error correcting code. The error correcting code may be a linear code or a non-linear code. For example, the error correcting code may be a BCH code, a Reed-Solomon code, Hadamard code, and the like. Multiple codes may be concatenated. Concatenated codes are error-correcting codes that are constructed from two or more simpler codes in order to achieve good performance with reasonable complexity. For example, a Hadamard code may be concatenated with a BCH code.

Encoded in the code word is the data for encapsulation. For example, code word may be partitioned into a data part, e.g., data bits and a parity part, e.g., parity bits. For example, the data for encapsulation may be comprised in the data bits. One way to generate a code word is to generate a data part and compute parity bits from the data part. For example, a data vector with data bits may be matrix multiplied by a parity matrix to obtain the parity bits, or even the full code word. The code word may be obtained by combining the data for encapsulation and the parity bits. For example, the data part and the parity part may be concatenated, although any permutation of data bits and parity bits may be used to produce a valid code word according to a corresponding error correcting code. For example, data bits and parity bits may be alternated. Note that reconciliation data is typically computed on single q-ary symbols, but parity data is typically computed from multiple bits; note that q is much larger than 2.

The code word may be used in various ways. Public key encryption may also be obtained by encrypting the message (m) at the second device 350, e.g., by a symmetric key, e.g., randomly generated for this purpose, and encoding the encrypting symmetric key in the code word. An additional key derivation step may be used. For example, a random pre-key may be encoded in the code word, and the encrypting key may be derived from the pre-key. For example, deriving may use a key derivation function (KDF), e.g., a hash function. For example, in the latter case, the encrypted message may be sent from the second device to the first device together with the required data for decrypting the data, e.g., the second public key, and other data, as described below. A transmission key may be directly encoded in the code word, or may be derived therefrom.

Interestingly, the code word is generated independent from first private key, first public key, second private key and second public key. Because of this, the protocol has increased resistance against active attacks. An attacker has fewer possibilities to influence the shared key since it cannot influence the key through the choice of the first and second private keys. In an embodiment, the second private key matrix is derived from the code word, or from the transmission key.

Independent generation may be obtained, e.g., in case of a message, if the message is generated from an application that is independent from the public key encryption, e.g., a financial or communication application, etc. Independent generation may be obtained, e.g., by random generation. For example, the key or pre-key in the code word may be generated independently, e.g., using a true random number generator, or using a pseudo random generator using a seed that is independent from the first and second private key, e.g., which is itself randomly generated, or pre-determined or the like. For example, the code word may be generated at the second device even before the first public key is received and/or before the second private key is generated; this also ensures independence.

Second device 350 comprises a Diffie-Hellman unit 375. Diffie-Hellman unit 375 is configured to generate a second raw shared key (k*) from the first public key (b) and the second private key (s). For example, the Diffie-Hellman unit 375 may be configured to apply a Diffie-Hellman function to the first public key and the second private key. For example, the Diffie-Hellman function may be multiplication. Second device 350 is configured to transfer its second public key to the first device 300. First device 300 comprises a Diffie-Hellman unit 325. Diffie-Hellman unit 325 is configured to generate a first raw shared key (k') from the second public key (u) and the first private key (r), e.g., by applying the same Diffie-Hellman function. Unfortunately, for some types of Diffie-Hellman functions it may happen that the first and second raw keys are close to each other, though not necessarily identical. The particular likelihood of this happening depends on the underlying Diffie-Hellman function. Some likelihood of different raw keys may be accepted in most applications, however, how high this likelihood may be will depend on the application. Typically though, a lower likelihood will be preferred. The raw key may be of the same mathematical type, e.g., matrix, as the private and public keys.

Second device 350 comprises a reliable bit generator 380 and a reconciliation data generator 385. Reliable bit generator 380 is configured to apply a reliable bit function to the second raw shared key (k*) to obtain reliable indices and reliable bits derived from the indicated coefficients. The reliable indices indicate the coefficients of the raw shared key. For example, the reliable bit generator 380 may determine which coefficients in the raw key are close to a sampling border and which are not. For example, the coefficients in the raw key which are within a threshold of a sampling border may be discarded as unreliable. The remaining, reliable, coefficient may be indicated by the reliable indices. The reliable bits may be obtained by sampling the reliable coefficients.

In case not enough coefficients remain, there are several possibilities, e.g., terminating the protocol, restarting the protocol with a new first and/or second private key, and/or new public object, deriving a shorter key, or discarding fewer coefficients. Instead of selecting all coefficients within a threshold, one may also select a pre-determined number of coefficients, e.g., mu coefficients, and select the most reliable coefficients, e.g., the first mu most reliable coefficients.

One way to implement reliable bits is take one or more, say B, most significant bits of a coefficients. For example, the number of reliable bits per selected coefficients may be, say, 1, or 2. In some embodiments, e.g., when large matrices are used the number of coefficients is large, which allows a high reliability, e.g., a low value for B. For other embodiments, e.g., for IoT devices larger values for B may be used. The computations in a finite ring may be done in the finite ring of the integers modulo a power of 2. The latter choice has the advantage of a more even distribution in the reliable bits.

Reconciliation data generator 385 is configured to generate reconciliation data (h) for the indicated coefficients of the raw shared key. The reconciliation data comprising information allowing reducing of differences between the first and second raw key derived at the first and second device. For example, applying reconciliation data may cause the difference, e.g., the Lee distance, between a coefficient of the raw keys at the first and second device to be reduced, thus increasing the probability that both will produce the same reliable bit. Both the parity bits in the code word and the reconciliation data server to reduce noise, however, the parity bits are computed over multiple data bits, whereas the reconciliation data is computed over coefficients in a raw shared key. The reconciliation data further increase the reliability of the reliable bits.

One way to implement reconciliation data is take one or more, say $b_h$, bits of a coefficients that follow the bits taken as reliable bits. For example, these may be the $b_h$ bits that follow the B bits in significance. For example, the number of reconciliation bits per selected coefficients may be, say, 1, or 2. A smaller number of reconciliation bits has the advantage of reducing communication overhead. A larger amount of reconciliation bits is possible though.

Second device 350 may comprise an encapsulation unit 390. Encapsulation unit 390 is configured to encapsulate the code word with the reliable bits by applying an encapsulation function, e.g., an XOR. The encapsulation may be one-time pad encapsulation. In an embodiment, the encapsulation function obtains perfect security, in the sense that the information on the code word that can be obtained from the encapsulated the code word is zero without knowing reliable bits. For example, an XOR function may be used, on one of the other encapsulation functions described herein.

Note that the encapsulation applies to the whole code word, including data bits and parity bits, and not just to parity bits. Furthermore, encapsulation is applied to generated data e.g., a message, a key, a pre-key, etc. not to data derived from one or more of the first or second public or private keys.

The second device is configured to transfer the second public key (u), the reconciliation data (h), the encapsulated data (c), and the reliable indices to the first device. The transferring may be in response to receiving the first public key, e.g., in case of key agreement, or not, e.g., in case of public key encryption.

The first device 300 is configured to receive from the second device a second public key (u), reconciliation data (h), and encapsulated data (c), and reliable indices. First device 300 comprises a reconciliation unit 335 configured to apply the reconciliation data (h) in a reconciliation function to the coefficients in the first raw shared key (k') indicated by the reliable indices (safe_bits), obtaining reliable bits (k). For example, a coefficient indicated as reliable may be reconciled using the reconciliation bits and then sampled to obtain a reliable bit.

First device 300 comprises a decapsulation unit 340 configured to decapsulate the encapsulated data (c) obtaining a near-code word using the reliable bits. The reason the code word of the second device may not be obtained directly is that even with reliable bits and reconciliation there may still be differences between the raw keys that are not resolved. First device 300 comprises an error corrector 320 that is configured to apply an error correction function to the near-code word obtaining a code word.

Finally, the code word may be decoded, e.g., to obtain the data part and thus obtain the message (m), the key (K) or pre-key. In the first case some action may be taken based on the message, e.g., the message may be displayed, e.g., in a communicator app. In the second case, the key may be used for further protected communications, etc. In the third case, a key derivation function may be applied to the pre-key to obtain a shared key.

Below a small but illustrative example is given for reliability, and reconciliation. We will take=$2^5$=32, and B=$b_h$=1. We will write coefficients as a five bit sequence, with the most significant bit at the left. For example, in an embodiment, the second device may discard coefficients 00000, 00001, 01110, 01111, 10000, 10001, 11110, and 11111 since only a small addition or subtraction to such coefficients will cause them to flip the most significant bit.

The coefficients that would not be discarded are 00010, 00011, . . . , 01101, and 10010, 10011, . . . , 11101. Coefficients in the first list would give a reliable bit of 0, and coefficients in the last list would give a reliable bit of 1. The second bit of these sequences may be taken as the reconciliation data. The reconciliation data of selected coefficients are transferred to the other device, but the reliable bits are not.

After the first device computes its raw key, it selects coefficients according to the coefficients indicated by the first device. Suppose for example, a coefficient in the raw key of the first device is 01101 and that the reconciliation data for that coefficient is 0. Since the second bit of the coefficient at the first device is not 0, this indicates to the first device that an error was made. The nearest value to selected coefficient 01101 with a second bit of 0, and which would not have been discarded, is 10010. Note that 00111 also has a second bit of 0, but is further from selected coefficient 01101. First device will thus select a 1 as reliable bit for this selected coefficient.

Note that if the noise was large, this correction may be wrong; it is conceivable that the second device had coefficient 00111. In such a case a wrong reliable bit is selected. Interestingly, even with moderate amounts of reconciliation data, these types of errors are rare. This means that rather than increasing the amount of reconciliation data, it is more efficient to rely on error correcting codes to correct the remaining number of errors. Minimizing Lee distance may simply be done by trying candidate modified coefficients at increasing Lee distance until a match is found. More advanced algorithms are also possible, e.g., a described in the art.

There is an interesting synergy between reliability and reconciliation. It may happen that the closest modified coefficient with the correct reconciliation data would have been discarded by the public-key encryption device. The closest modified coefficient with the correct reconciliation data and the additional constraint that it would not have been discarded by the public-key encryption device may have a different reliable bit. Taking this into account further increases the efficacy of the reconciliation bits. For example, continuing the example above, consider that the second device obtains the coefficient 01100, with reconciliation data 0. The closest modified coefficient would be 10000, but the closest coefficient that would not have been discarded is 00111. Accordingly, the first device recovers the reliable bit 0 rather than 1.

In some embodiments, the processor of the public-key encryption device is configured to derive a final key based on at least the transmission key, encrypt a message with the final key, and to transfer said encrypted message to the private-key decryption device. In some embodiments, the processor of the private-key decryption device is configured to receive an encrypted message from the private-key decryption device, to derive the final key based on at least the transmission key, and to decrypt the encrypted message with the final key.

For example, in an embodiment, the public-key encryption device and/or the private key decryption device may derive the final key at least based in part on applying a cryptographic hash function to the transmission key. As an illustrative example, the final key may be derived from the transmission key K by applying a cryptographic hash function to the transmission key and optionally part or whole of the public key, e.g., G=H(m∥pk). Such a cryptographic hash G may be used directly as final key, or, optionally, at least part of such a cryptographic hash, e.g., L∥rest=G, may be further hashed, e.g., with the masked transmission key c, to obtain the final key, e.g., k=H(L∥c).

The following numbered embodiments are further envisaged:
1. A public-key encryption device (20) comprising
   a communication interface configured to communicate with a private-key decryption device (10),
   a processor configured to
      obtain a first public-key matrix (b) associated with the private-key decryption device,
      generate a transmission key (K),
      generate a second private-key matrix (s), and compute a second public-key matrix (u) from the second private-key matrix (s), the second public-key matrix (u) having fewer matrix elements than the first public-key matrix (b),
      compute a second raw shared key (k*) from the second private-key matrix (s) and the first public-key matrix (b), computing the second raw shared key comprising a matrix multiplication between the second private-key matrix (s) and the first public-key matrix (b),
      encapsulate the transmission key (K) with at least part of the second raw shared key by applying an encapsulation function, obtaining encapsulated data (c),
      transfer the second public-key matrix (u), and the encapsulated data (c) to the private-key decryption device.
2. A private-key decryption device (10) comprising
   a communication interface configured to communicate with a public-key encryption device (20),
   a processor configured to
      generate a first private-key matrix (r) and compute a first public-key matrix (b) from the first private-key matrix (r), and allow transfer of the first public-key matrix (b) to the public-key encryption device,
      receive from the public-key encryption device a second public-key matrix (u) and encapsulated data (c), the second public-key matrix (u) having fewer matrix elements than the first public-key matrix (b),
      compute a first raw shared key (k') from the second public-key matrix (u) and the first private-key matrix (r), computing the first raw shared key comprising a matrix multiplication between the second public-key matrix (u) and the first private-key matrix (r),
      decapsulate the encapsulated data (c) using at least part of the first raw shared key (k') to obtain a transmission key.
3. A public-key encryption device or private-key decryption device as in any one of the preceding numbered embodiments, wherein
   the processor of the public-key encryption device is configured to
      obtain a key size for the transmission key (K) and to generate the transmission key (K) according to said key size,
      determine a matrix size for the second private-key matrix (s) to accommodate encapsulation of the transmission key of said key size and generate the second private-key matrix (s) according to the matrix size, and
      transfer an indication of the key size and/or matrix size to the private-key decryption device, and/or
   the processor of the private-key decryption device is configured to
      receive an indication of a key size and/or matrix size from the public-key encryption device, and
      in dependence on the received size, decapsulate the encapsulated data (c) to obtain the transmission key.
4. A public-key encryption device or private-key decryption device as in any one of the preceding numbered embodiments, wherein
   the processor of the public-key encryption device is configured to encrypt a message (m) with the transmission key, and to transfer said encrypted message to the private-key decryption device, and/or
   the processor of the private-key decryption device is configured to receive an encrypted message from the private-key decryption device, and to decrypt the encrypted message with the transmission key.
5. A public-key encryption device or private-key decryption device as in any one of the preceding numbered embodiments, wherein
   the second raw key is a matrix, encapsulating the transmission key (K) comprising adding bits of the transmission key to a most significant part of at least part of the elements of the second raw key matrix, and discarding zero or more least significant bits of the at least part of the elements of the second raw key matrix,
   the first raw key is a matrix, decapsulating the encapsulated data comprising discarding zero or more least significant bits of at least part of the elements of the first raw key matrix, subtracting the at least part of the elements of the first raw key matrix from the encapsulated data, and rounding the subtracting result.

Figure 6A:
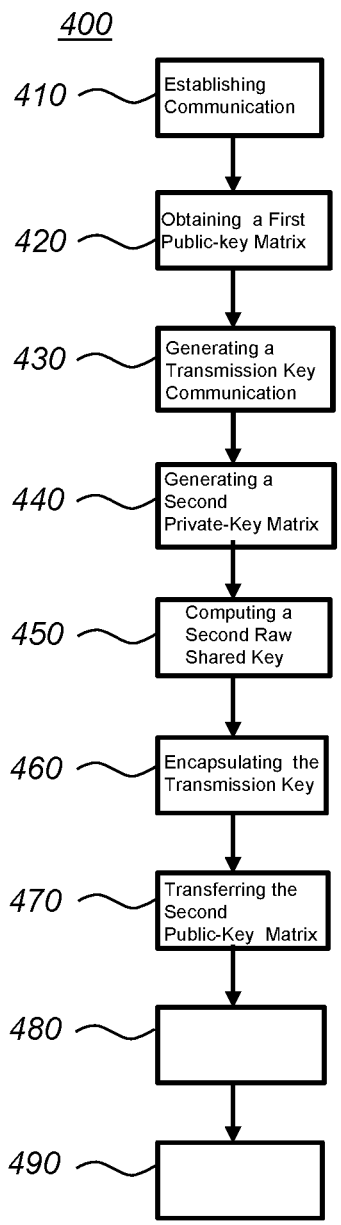

FIG. 6a schematically shows an example of a public-key encryption method (400) according to an embodiment. Method 400 comprises
   establishing (410) communication with a private-key decryption device,
   obtaining (420) a first public-key matrix (b) associated with the private-key decryption device,
   generating (430) a transmission key (K),
   generating (440) a second private-key matrix (s), and compute a second public-key matrix (u) from the second private-key matrix (s), the second public-key matrix (u) having fewer matrix elements than the first public-key matrix (b),
   computing (450) a second raw shared key (k*) from the second private-key matrix (s) and the first public-key matrix (b), computing the second raw shared key comprising a matrix multiplication between the second private-key matrix (s) and the first public-key matrix (b),
   encapsulating (460) the transmission key (K) with at least part of the second raw shared key by applying an encapsulation function, obtaining encapsulated data (c),
   transferring (470) the second public-key matrix (u), and the encapsulated data (c) to the private-key decryption device.

Figure 6B:
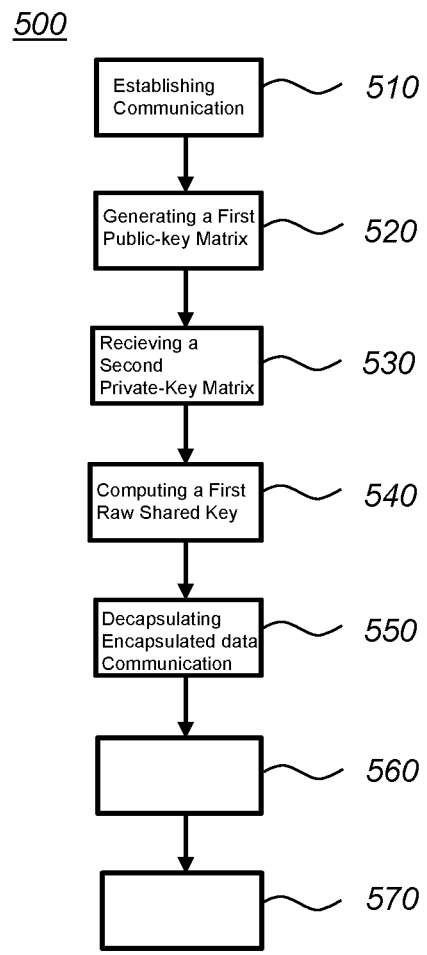
Figure 7A:
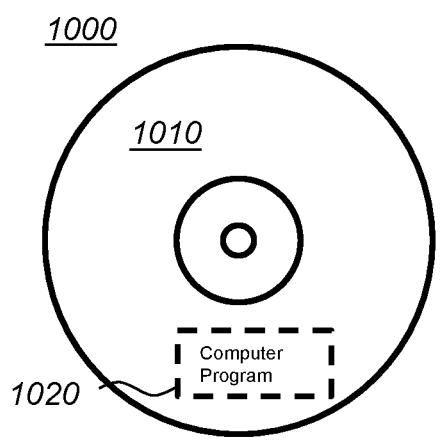
Figure 7B:
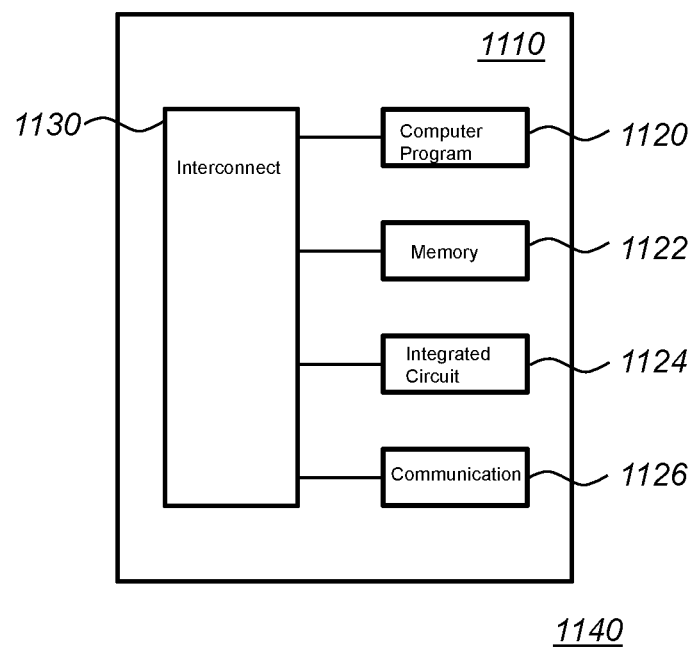

FIG. 6b schematically shows an example of a private-key decryption method 500 according to an embodiment. Method 500 comprises establishing (510) communication with a public-key encryption device generating (520) a first private-key matrix (r) and compute a first public-key matrix (b) from the first private-key matrix (r), and allow transfer of the first public-key matrix (b) to the public-key encryption device, receiving (530) from the public-key encryption device a second public-key matrix (u) and encapsulated data (c), the second public-key matrix (u) having fewer matrix elements than the first public-key matrix (b), computing (540) a first raw shared key (k') from the second public-key matrix (u) and the first private-key matrix (r), computing the first raw shared key comprising a matrix multiplication between the second public-key matrix (u) and the first private-key matrix (r), decapsulating (550) the encapsulated data (c) using at least part of the first raw shared key (k') to obtain a transmission key.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

Embodiments of the method may be executed using software, which comprises instructions for causing a processor system to perform method 400 and/or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A public-key encryption device comprising:
a communication interface circuit, wherein the communication interface circuit is arranged to communicate with a private-key decryption device; and
a processor circuit,
wherein the processor circuit is arranged to obtain a first public-key matrix,
wherein the public-key matrix is associated with the private-key decryption device,
wherein the processor circuit is arranged to obtain a key size for a transmission key,
wherein the processor circuit is arranged to generate the transmission key according to the key size,
wherein the processor circuit is arranged to determine a matrix size for a second private-key matrix,
wherein the matrix size is arranged to accommodate masking of the transmission key,
wherein the processor circuit is arranged to generate the second private-key matrix according to the matrix size,
wherein the processor circuit is arranged to compute a second public-key matrix from the second private-key matrix,
wherein the second public-key matrix has fewer matrix elements than the first public-key matrix,
wherein the processor circuit is arranged to compute a second raw shared key from the second private-key matrix and the first public-key matrix,
wherein computing the second raw shared key comprises a matrix multiplication between the second private-key matrix and the first public-key matrix,
wherein the processor circuit is arranged to mask the transmission key with at least part of the second raw shared key,
wherein the processor circuit is arranged to transfer an indication of the key size and/or matrix size, the second public-key matrix, and the masked transmission key to the private-key decryption device
wherein the processor circuit is arranged to perform a handshake with the private-key decryption device, the handshake comprising:
receiving at least two indications of at least two first public-key matrices of the private-key decryption device from the private-key decryption device, wherein the two first public-key matrices have different sizes;
selecting the larger of the first public-key matrix and the second public-key matrix;
sending an indication of the selected first public-key matrix to the private-key decrypting device; and
requesting the first public-key matrix when the first public-key matrix is not available in a key-cache, wherein the transmission key is encapsulated with the selected first-public key.

2. A private-key decryption device comprising:
a communication interface circuit, wherein the communication interface circuit is arranged to communicate with a public-key encryption device; and
a processor circuit,
wherein the processor circuit is arranged to generate a first private-key matrix,
wherein the processor circuit is arranged to compute a first public-key matrix from the first private-key matrix,
wherein the processor circuit is arranged to allow transfer of the first public-key matrix to the public-key encryption device,
wherein the processor circuit is arranged to receive from the public-key encryption device an indication of a key size and/or matrix size, a second public-key matrix and a masked transmission key,
wherein the second public-key matrix has fewer matrix elements than the first public-key matrix,
wherein the processor circuit is arranged to compute a first raw shared key from the second public-key matrix and the first private-key matrix,
wherein the processor circuit is arranged to compute the first raw shared key,
wherein the computing comprises a matrix multiplication between the second public-key matrix and the first private-key matrix,
wherein the processor circuit is arranged to unmask the masked transmission key in dependence on the received size using at least part of the first raw shared key to obtain a transmission key,
wherein the processor circuit is arranged to perform a handshake with the public-key encryption device, the handshape comprising:
sending to the public-key encryption device at least two indications of at least two first public-key matrices of the private-key decryption device, wherein the two first public-key matrices have different sizes;
receiving an indication of a selected first public-key matrix from the public-key encryption device;
sending the selected first public-key matrix, when a request for the selected first public-key matrix is received, wherein the transmission key is decapsulated with the selected first-public key.

3. The public-key encryption device of claim 1,
wherein the second private-key matrix has fewer matrix elements than the first public-key matrix, and/or
the second public-key matrix has fewer matrix elements than the first private-key matrix.

4. The public-key encryption device of claim 1,
wherein the second public-key matrix has a first system dimension and a second dimension,
wherein the first public-key matrix has the first system dimension and a second dimension,
wherein the second dimension of the second public-key matrix is smaller than the second dimension of the first public-key matrix.

5. The public-key encryption device of claim 4,
wherein the second dimension of the second public-key matrix is at most half of the second dimension of the first public-key matrix, and/or
wherein the second dimension of the second public-key matrix is 1.

6. The public-key encryption device of claim 1, wherein the second dimension of the second public-key matrix is configurable.

7. The public-key encryption device of claim 1,
wherein the processor circuit is arranged to obtain a public matrix associated with the first public-key matrix,
wherein the computing of the second public-key matrix comprises a noisy matrix multiplication between the second private-key matrix and the public matrix,
wherein the public matrix is shared between the public-key encryption device and the private-key decryption device.

8. The public-key encryption device of claim 7,
wherein the noisy matrix multiplication comprises scaling from q elements to p elements, wherein $\log_2 p/\log_2 q \le 0.85$,
wherein the public-key encryption device is arranged to generate reconciliation data for the at least part of the second raw shared key,
wherein the reconciliation data comprises information allowing reduction of differences between the first and second raw key derived at the public-key encryption device and the private-key decryption device,
wherein the public-key encryption device is arranged to transfer the reconciliation data to the private-key decryption device,
wherein the public-key encryption device is arranged to generate parity bits for the transmission key,
wherein the transmission key and the parity bits form a code word according to an error correction code,
wherein masking the transmission key comprises encapsulating the code word.

9. The public-key encryption device of claim 1,
wherein the processor circuit is arranged to derive a final key based on at least the transmission key,
wherein the processor circuit is arranged to encrypt a message with the final key,
wherein the processor circuit is arranged to transfer the encrypted message to the private-key decryption device.

10. The public-key encryption device of claim 1, wherein the transmission key is a random, and/or ephemeral and/or symmetric and/or independent from the first public-key matrix.

11. The public-key encryption device of claim 1,
wherein the processor circuit is arranged to compute helper data,
wherein the helper data is arranged to reduce the error rate in obtaining the transmission key at the private-key decryption device,
wherein the processor circuit is arranged to send the helper data to the private-key decryption device.

12. The public-key encryption device of claim 1,
wherein the second raw key is a matrix,
wherein a masking the transmission key comprises adding bits of the transmission key to a most significant part of at least part of the elements of the second raw key matrix, and discarding zero or more least significant bits of the at least part of the elements of the second raw key matrix,
wherein the first raw key is a matrix,
wherein an unmasking the masked transmission key comprises discarding zero or more least significant bits of at least part of the elements of the first raw key matrix, subtracting the at least part of the elements of the first raw key matrix from the encapsulated data, and rounding the subtracting result.

13. The public-key encryption device of claim 1, wherein the processor circuit of the public-key encryption device is arranged to derive the second private-key matrix from the transmission key.

14. The public-key encryption device of claim 1, wherein the processor circuit of the public-key encryption device is arranged to obtain the first public-key matrix from a public-key database.

15. The public-key encryption device of claim 1,
wherein the first public-key and the second public-key are a matrix over a ring,
wherein the first private-key and the second private-key are a matrix over a ring,
wherein the first raw key and the second raw key are a matrix over a ring.

16. A public-key encryption method comprising:
establishing communication with a private-key decryption device;
obtaining a first public-key matrix, wherein the first public-key matrix is associated with the private-key decryption device;
obtaining a key size for the transmission key;
generating a transmission key according to the key size;
determining a matrix size for the second private-key matrix, wherein the matrix size is arranged to accommodate masking of the transmission key;
generating a second private-key matrix according to the matrix size;
computing a second public-key matrix from the second private-key matrix, wherein the second public-key matrix has fewer matrix elements than the first public-key matrix;
computing a second raw shared key from the second private-key matrix and the first public-key matrix;
computing the second raw shared key, wherein the second raw shared key comprises a matrix multiplication between the second private-key matrix and the first public-key matrix;
masking the transmission key with at least part of the second raw shared key; and
transferring an indication of the key size and/or matrix size, the second public-key matrix, and the masked transmission key to the private-key decryption device; and
performing a handshake with the private-key decryption device, wherein the handshaking comprises:
receiving at least two indications of at least two first public-key matrices of the private-key decryption device from the private-key decryption device,
wherein the two first public-key matrices have different sizes;
selecting the larger of the first public-key matrix and the second public-key matrix;
sending an indication of the selected first public-key matrix to the private-key decrypting device; and
requesting the first public-key matrix when the first public-key matrix is not available in a key-cache,
wherein the transmission key is encapsulated with the selected first-public key.

17. A private-key decryption method comprising:
establishing communication with a public-key encryption device;
generating a first private-key matrix;
computing a first public-key matrix from the first private-key matrix, and allow transfer of the first public-key matrix to the public-key encryption device;
receiving from the public-key encryption device an indication of a key size and/or matrix size;
receiving a second public-key matrix and a masked transmission key, wherein the second public-key matrix has fewer matrix elements than the first public-key matrix;
computing a first raw shared key from the second public-key matrix and the first private-key matrix;
computing the first raw shared key comprising a matrix multiplication between the second public-key matrix and the first private-key matrix; and
unmasking the masked transmission key in dependence on the received size using at least part of the first raw shared key to obtain a transmission key wherein the processor circuit is arranged to perform a handshake with the public-key encryption device, the handshape comprising:
sending to the public-key encryption device at least two indications of at least two first public-key matrices of the private-key decryption device, wherein the two first public-key matrices have different sizes;
receiving an indication of a selected first public-key matrix from the public-key encryption device;
sending the selected first public-key matrix, when a request for the selected first public-key matrix is received, wherein the transmission key is decapsulated with the selected first-public key.

18. A computer program stored on a non-transitory medium, wherein the computer program when executed on a processor:
establishes communication with a public-key encryption device;
generates a first private-key matrix;
computes a first public-key matrix from the first private-key matrix, and allow transfer of the first public-key matrix to the public-key encryption device;
receives from the public-key encryption device an indication of a key size and/or matrix size;
receives a second public-key matrix and a masked transmission key, wherein the second public-key matrix has fewer matrix elements than the first public-key matrix;
computes a first raw shared key from the second public-key matrix and the first private-key matrix;
computes the first raw shared key comprising a matrix multiplication between the second public-key matrix and the first private-key matrix; and
unmasks the masked transmission key in dependence on the received size using at least part of the first raw shared key to obtain a transmission key; and
performing a handshake with the private-key decryption device, wherein the handshaking comprises:
receiving at least two indications of at least two first public-key matrices of the private-key decryption device from the private-key decryption device,
wherein the two first public-key matrices have different sizes;
selecting the larger of the first public-key matrix and the second public-key matrix;

sending an indication of the selected first public-key matrix to the private-key decrypting device; and
requesting the first public-key matrix when the first public-key matrix is not available in a key-cache, wherein the transmission key is encapsulated with the selected first-public key.

19. A computer program stored on a non-transitory medium, wherein the computer program when executed on a processor:
establishes communication with a public-key encryption device;
generates a first private-key matrix;
computes a first public-key matrix from the first private-key matrix, and allow transfer of the first public-key matrix to the public-key encryption device;
receives from the public-key encryption device an indication of a key size and/or matrix size;
receives a second public-key matrix and a masked ansmission key, wherein the second public-key matrix has fewer matrix elements than the first public-key matrix;
computes a first raw shared key from the second public-key matrix and the first private-key matrix;
computes the first raw shared key comprising a matrix multiplication between the second public-key matrix and the first private-key matrix; and
unmasks the masked transmission key in dependence on the received size using at least part of the first raw shared key to obtain a transmission key,
wherein the processor circuit is arranged to perform a handshake with the public-key encryption device, the handshape comprising:
sending to the public-key encryption device at least two indications of at least two first public-key matrices of the private-key decryption device, wherein the two first public-key matrices have different sizes;
receiving an indication of a selected first public-key matrix from the public-key encryption device;
sending the selected first public-key matrix, when a request for the selected first public-key matrix is received, wherein the transmission key is decapsulated with the selected first-public key.

20. The private-key decryption device of claim 2, wherein the second private-key matrix has fewer matrix elements than the first public-key matrix, and/or the second public-key matrix has fewer matrix elements than the first private-key matrix.

21. The private-key decryption device of claim 2, wherein the second public-key matrix has a first system dimension and a second dimension,
wherein the first public-key matrix has the first system dimension and a second dimension,
wherein the second dimension of the second public-key matrix is smaller than the second dimension of the first public-key matrix.

22. The private-key decryption device of claim 21, wherein the second dimension of the second public-key matrix is at most half of the second dimension of the first public-key matrix, and/or
wherein the second dimension of the second public-key matrix is 1.

23. The private-key decryption device of claim 22, wherein the second dimension of the second public-key matrix is configurable.

24. The private-key decryption device of claim 2, wherein the processor circuit of the private-key decryption device is arranged to generate a public matrix,
wherein the computing of the first public-key matrix comprises a noisy matrix multiplication between the first private-key matrix and the public matrix,
wherein the public matrix is shared between the public-key encryption device and the private-key decryption device,
wherein the first public-key matrix is associated with the public matrix.

25. The private-key decryption device of claim 24, wherein the noisy matrix multiplication comprises scaling from q elements to p elements, wherein $\log_2 p/\log_2 q \leq 0.85$,
wherein the private-key decryption device is arranged to receive reconciliation data for the at least part of the first raw shared key,
wherein the reconciliation data comprises information allowing reducing of differences between the first raw key and a second raw key,
wherein the second raw key is derived at the public-key encryption device and the private-key decryption device,
wherein the private-key decryption device is arranged to apply a reconciliation function to the at least part of the first raw shared key and the reconciliation data,
wherein the private-key decryption device is arranged to unmask the masked transmission key to obtain a near-code word, apply an error correcting according to the error correcting code.

26. The private-key decryption device of claim 2,
wherein the processor circuit is arranged to receive an encrypted message from the private-key decryption device, to derive the final key based on at least the transmission key, and to decrypt the encrypted message with the final key.

27. The private-key decryption device of claim 2, wherein the transmission key is a random, and/or ephemeral and/or symmetric and/or independent from the first public-key matrix.

28. The private-key decryption device of claim 2,
wherein the processor circuit is arranged to receive helper data from the public-key encryption device,
wherein the processor circuit is arranged to apply the helper data to reduce the error rate in obtaining the transmission key at the private-key decryption device.

29. The private-key decryption device of claim 2,
wherein the second raw key is a matrix,
wherein a masking the transmission key comprises adding bits of the transmission key to a most significant part of at least part of the elements of the second raw key matrix, and discarding zero or more least significant bits of the at least part of the elements of the second raw key matrix,
wherein the first raw key is a matrix,
wherein an unmasking the masked transmission key comprises discarding zero or more least significant bits of at least part of the elements of the first raw key matrix, subtracting the at least part of the elements of the first raw key matrix from the encapsulated data, and rounding the subtracting result.

30. The private-key decryption device of claim 2,
wherein the processor circuit is arranged to reconstruct the second private-key matrix from the transmission key,
wherein the processor circuit is arranged to verify the computation of the second public-key and/or the computation of the encapsulated transmission key.

31. The private-key decryption device of claim 2, wherein the processor circuit of the private-key decryption device is arranged to deposit the first public-key matrix in a public-key database.

32. The private-key decryption device of claim 2, wherein the first public-key and the second public-key are a matrix over a ring,
wherein the first private-key and the second private-key are a matrix over a ring,
wherein the first raw key and the second raw key are a matrix over a ring.

* * * * *